(12) United States Patent
Djugash et al.

(10) Patent No.: US 10,391,631 B2
(45) Date of Patent: Aug. 27, 2019

(54) MODULAR ROBOT WITH SMART DEVICE

(71) Applicant: Toyota Motor Engineering & Manufacturing North America, Inc., Erlanger, KY (US)

(72) Inventors: Joseph M. A. Djugash, San Jose, CA (US); Douglas A. Moore, Livermore, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 221 days.

(21) Appl. No.: 15/451,313

(22) Filed: Mar. 6, 2017

(65) Prior Publication Data
US 2017/0173787 A1 Jun. 22, 2017

Related U.S. Application Data

(63) Continuation of application No. 14/634,523, filed on Feb. 27, 2015, now Pat. No. 9,586,318.

(51) Int. Cl.
*B25J 9/16* (2006.01)
*B25J 9/00* (2006.01)
(Continued)

(52) U.S. Cl.
CPC ............ *B25J 9/161* (2013.01); *B25J 9/0003* (2013.01); *B25J 9/1694* (2013.01); *B25J 13/00* (2013.01);
(Continued)

(58) Field of Classification Search
CPC . B25J 9/1694; B25J 9/161; B25J 13/00; B25J 13/006; G06F 1/163; G06F 3/011; Y10S 901/01; Y10S 901/46
See application file for complete search history.

(56) References Cited

U.S. PATENT DOCUMENTS

| | | |
|---|---|---|
| 4,520,501 A | 5/1985 | DuBrucq |
| 4,586,827 A | 5/1986 | Hirsch et al. |
| (Continued) | | |

FOREIGN PATENT DOCUMENTS

| | | |
|---|---|---|
| CN | 201260746 | 6/2009 |
| CN | 101527093 | 9/2009 |
| (Continued) | | |

OTHER PUBLICATIONS

Zhang, Shanjun; Yoshino, Kazuyoshi; A Braille Recognition System by the Mobile Phone with Embedded Camera; 2007; IEEE.
(Continued)

*Primary Examiner* — Rachid Bendidi
(74) *Attorney, Agent, or Firm* — Snell & Wilmer LLP

(57) ABSTRACT

A wearable smart device is configured to be positioned on and external to a robot having a robot sensor for sensing robot data and a robot input/output port. The wearable smart device includes a device sensor capable of detecting device data corresponding to an environment of the wearable smart device. The wearable smart device also includes a device input/output port. The wearable smart device also includes a device processor coupled to the robot sensor via the robot input/output port and the device input/output port. The device processor is also coupled to the device sensor and configured to control the robot based on the robot data and the device data.

12 Claims, 14 Drawing Sheets

(51) Int. Cl.
  *B25J 13/00* (2006.01)
  *G06F 1/16* (2006.01)
  *G06F 3/01* (2006.01)

(52) U.S. Cl.
  CPC ............ *B25J 13/006* (2013.01); *G06F 1/163* (2013.01); *G06F 3/011* (2013.01); *Y10S 901/01* (2013.01); *Y10S 901/46* (2013.01)

(56) References Cited

U.S. PATENT DOCUMENTS

| | | |
|---|---|---|
| 4,786,966 A | 11/1988 | Hanson |
| 5,047,952 A | 9/1991 | Kramer |
| 5,097,856 A | 3/1992 | Chi-Sheng |
| 5,129,716 A | 7/1992 | Holakovszky et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,395,968 B2 | 3/2013 | Vartanian et al. |
| 8,401,785 B2 | 3/2013 | Cho et al. |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori et al. |
| 8,797,141 B2 | 8/2014 | Best et al. |
| 8,797,386 B2 | 8/2014 | Chou et al. |
| 8,803,699 B2 | 8/2014 | Foshee et al. |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |

(56) References Cited

U.S. PATENT DOCUMENTS

| | | |
|---|---|---|
| D743,933 S | 11/2015 | Park et al. |
| 9,190,058 B2 | 11/2015 | Klein |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Hunter |
| 2003/0133085 A1 | 7/2003 | Tretiakoff |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0020845 A1 | 1/2005 | Suzuki et al. |
| 2005/0221260 A1 | 10/2005 | Kikuchi |
| 2005/0283752 A1 | 12/2005 | Fruchter |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0230786 A1 | 10/2007 | Foss |
| 2007/0296572 A1 | 12/2007 | Fein et al. |
| 2008/0024594 A1 | 1/2008 | Ritchey |
| 2008/0068559 A1 | 3/2008 | Howell |
| 2008/0120029 A1 | 5/2008 | Zelek et al. |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1* | 11/2010 | Sugihara ............. G06N 3/008 700/248 |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0207356 A1 | 8/2012 | Murphy |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0243250 A1 | 9/2013 | France et al. |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0268116 A1* | 10/2013 | Kim ............. B25J 9/16 700/245 |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0031081 A1 | 1/2014 | Vossoughi |
| 2014/0032596 A1 | 1/2014 | Fish et al. |
| 2014/0037149 A1 | 2/2014 | Zetune |
| 2014/0071234 A1 | 3/2014 | Millett |

(56) References Cited

U.S. PATENT DOCUMENTS

| | | |
|---|---|---|
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0184384 A1 | 7/2014 | Zhu et al. |
| 2014/0204245 A1 | 7/2014 | Wexler |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0135310 A1 | 5/2015 | Lee |
| 2015/0141085 A1 | 5/2015 | Nuovo et al. |
| 2015/0142891 A1 | 5/2015 | Haque |
| 2015/0154643 A1 | 6/2015 | Artman et al. |
| 2015/0125831 A1 | 7/2015 | Chandrashekhar Nair et al. |
| 2015/0196101 A1 | 7/2015 | Dayal et al. |
| 2015/0198454 A1 | 7/2015 | Moore et al. |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0330787 A1 | 11/2015 | Cioffi et al. |
| 2015/0336276 A1* | 11/2015 | Song ................ B25J 11/001 700/253 |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka |
| 2015/0367176 A1 | 12/2015 | Bejestan |
| 2016/0007158 A1 | 1/2016 | Venkatraman |
| 2016/0028917 A1 | 1/2016 | Wexler |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 4727352 | 7/2011 |
| KR | 100405636 | 11/2003 |
| KR | 20080080688 | 9/2008 |
| KR | 20120020212 | 3/2012 |
| KR | 1250929 | 4/2013 |
| WO | WO 1995004440 | 2/1995 |
| WO | WO 9949656 | 9/1999 |
| WO | WO 0038393 | 6/2000 |
| WO | WO 179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008127316 | 10/2008 |
| WO | WO 2010/062481 | 6/2010 |
| WO | WO 2010/109313 | 9/2010 |
| WO | WO 2012/040703 | 3/2012 |
| WO | WO 2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014/172378 | 10/2014 |
| WO | WO 2015065418 | 5/2015 |
| WO | WO 2015092533 | 6/2015 |
| WO | WO 2015108882 | 7/2015 |
| WO | WO 2015127062 | 8/2015 |

OTHER PUBLICATIONS

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

The Nex Band; http://www.mightycast.com/#faq; May 19, 2015; 4 pages.

Cardonha et al.; "*A Crowdsourcing Platform for the Construction of Accessibility Maps*"; W4A'13 Proceedings of the 10th International Cross-Disciplinary Conference on Web Accessibility; Article No. 26; 2013; 5 pages.

Bujacz et al.; "*Remote Guidance for the Blind—A Proposed Teleassistance System and Navigation Trials*"; Conference on Human System Interactions; May 25-27, 2008; 6 pages.

Rodriguez et al; "*CrowdSight: Rapidly Prototyping Intelligent Visual Processing Apps*"; AAAI Human Computation Workshop (HCOMP); 2011; 6 pages.

Chaudary et al.; "*Alternative Navigation Assistance Aids for Visually Impaired Blind Persons*"; Proceedings of ICEAPVI; Feb. 12-14, 2015; 5 pages.

Garaj et al.; "*A System for Remote Sighted Guidance of Visually Impaired Pedestrians*"; The British Journal of Visual Impairment; vol. 21, No. 2, 2003; 9 pages.

Coughlan et al.; "*Crosswatch: A System for Providing Guidance to Visually Impaired Travelers at Traffic Intersections*"; Journal of Assistive Technologies 7.2; 2013; 17 pages.

(56) References Cited

OTHER PUBLICATIONS

Sudol et al.; "LookTel—A Comprehensive Platform for Computer Aided Visual Assistance"; Computer Vision and Pattern Recognition Workshops (CVPRW), 2010 IEEE Computer Society Conference; Jun. 13-18, 2010; 8 pages.

Paladugu et al.; "GoingEasy® with Crowdsourcing in the Web 2.0 World for Visually Impaired Users: Design and User Study"; Arizona State University; 8 pages.

Kammoun et al.; "Towards a Geographic Information System Facilitating Navigation of Visually Impaired Users"; Springer Berlin Heidelberg; 2012; 8 pages.

Bigham et al.; "VizWiz: Nearly Real-Time Answers to Visual Questions" Proceedings of the 23nd annual ACM symposium on User interface software and technology; 2010; 2 pages.

Guy et al; "CrossingGuard: Exploring Information Content in Navigation Aids for Visually Impaired Pedestrians" Proceedings of the SIGCHI Conference on Human Factors in Computing Systems; May 5-10, 2012; 10 pages.

Zhang et al.; "A Multiple Sensor-Based Shoe-Mounted User Interface Designed for Navigation Systems for the Visually Impaired"; $5^{th}$ Annual ICST Wireless Internet Conference (WICON); Mar. 1-3, 2010; 9 pages.

Shoval et al.; "Navbelt and the Guidecane—Robotics-Based Obstacle-Avoidance Systems for the Blind and Visually Impaired"; IEEE Robotics & Automation Magazine, vol. 10, Issue 1; Mar. 2003; 12 pages.

Dowling et al.; "Intelligent Image Processing Constraints for Blind Mobility Facilitated Through Artificial Vision"; $8^{th}$ Australian and NewZealand Intelligent Information Systems Conference (ANZIIS); Dec. 10-12, 2003; 7 pages.

Heyes, Tony; "The Sonic Pathfinder an Electronic Travel Aid for the Vision Impaired"; http://members.optuszoo.com.au/aheyew40/pa/pf_blerf.html; Dec. 11, 2014; 7 pages.

Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.

Wilson, Jeff, et al. "Swan: System for Wearable Audio Navigation"; 11th IEEE International Symposium on Wearable Computers; Oct. 11-13, 2007; 8 pages.

Borenstein et al.; "The GuideCane—A Computerized Travel Aid for the Active Guidance of Blind Pedestrians"; IEEE International Conference on Robotics and Automation; Apr. 21-27, 1997; 6 pages.

Bhatlawande et al.; "Way-finding Electronic Bracelet for Visually Impaired People"; IEEE Point-of-Care Healthcare Technologies (PHT), Jan. 16-18, 2013; 4 pages.

Blenkhorn et al.; "An Ultrasonic Mobility Device with Minimal Audio Feedback"; Center on Disabilities Technology and Persons with Disabilities Conference; Nov. 22, 1997; 5 pages.

Mann et al.; "Blind Navigation with a Wearable Range Camera and Vibrotactile Helmet"; $19^{th}$ ACM International Conference on Multimedia; Nov. 28, 2011; 4 pages.

Shoval et al.; "The Navbelt—A Computerized Travel Aid for the Blind"; RESNA Conference, Jun. 12-17, 1993; 6 pages.

Kumar et al.; "An Electronic Travel Aid for Navigation of Visually Impaired Persons"; Communications Systems and Networks (COMSNETS), 2011 Third International Conference; Jan. 2011; 5 pages.

Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.

Greenberg et al.; "Finding Your Way: A Curriculum for Teaching and Using the Braillenote with Sendero GPS 2011"; California School for the Blind; 2011; 190 pages.

Helal et al.; "Drishti: An Integrated Navigation System for Visually Impaired and Disabled"; Fifth International Symposium on Wearable Computers; Oct. 8-9, 2001; 8 pages.

Parkes, Don; "Audio Tactile Systems for Designing and Learning Complex Environments as a Vision Impaired Person: Static and Dynamic Spatial Information Access"; EdTech-94 Proceedings; 1994; 8 pages.

Zeng et al.; "Audio-Haptic Browser for a Geographical Information System"; ICCHP 2010, Part II, LNCS 6180; Jul. 14-16, 2010; 8 pages.

AlZuhair et al.; "NFC Based Applications for Visually Impaired People—A Review"; IEEE International Conference on Multimedia and Expo Workshops (ICMEW), Jul. 14, 2014; 7 pages.

Graf, Christian; "Verbally Annotated Tactile Maps—Challenges and Approaches"; Spatial Cognition VII, vol. 6222; Aug. 15-19, 2010; 16 pages.

Hamid, Nazatul Naquiah Abd; "Facilitating Route Learning Using Interactive Audio-Tactile Maps for Blind and Visually Impaired People"; CHI 2013 Extended Abstracts; Apr. 27, 2013; 6 pages.

Ramya, et al.; "Voice Assisted Embedded Navigation System for the Visually Impaired"; International Journal of Computer Applications; vol. 64, No. 13, Feb. 2013; 7 pages.

Caperna et al.; "A Navigation and Object Location Device for the Blind"; Tech. rep. University of Maryland College Park; May 2009; 129 pages.

Burbey et al.; "Human Information Processing with the Personal Memex"; ISE 5604 Fall 2005; Dec. 6, 2005; 88 pages.

Ghiani, et al.; "Vibrotactile Feedback to Aid Blind Users of Mobile Guides"; Journal of Visual Languages and Computing 20; 2009; 13 pages.

Guerrero et al.; "An Indoor Navigation System for the Visually Impaired"; Sensors vol. 12, Issue 6; Jun. 13, 2012; 23 pages.

Nordin et al.; "Indoor Navigation and Localization for Visually Impaired People Using Weighted Topological Map"; Journal of Computer Science vol. 5, Issue 11; 2009; 7 pages.

Hesch et al.; "Design and Analysis of a Portable Indoor Localization Aid for the Visually Impaired"; International Journal of Robotics Research; vol. 29; Issue 11; Sep. 2010; 15 pgs.

Joseph et al.; "Visual Semantic Parameterization—To Enhance Blind User Perception for Indoor Navigation"; Multimedia and Expo Workshops (ICMEW), 2013 IEEE International Conference; Jul. 15, 2013; 7 pages.

Katz et al; "NAVIG: Augmented Reality Guidance System for the Visually Impaired"; Virtual Reality (2012) vol. 16; 2012; 17 pages.

Rodríguez et al.; "Assisting the Visually Impaired: Obstacle Detection and Warning System by Acoustic Feedback"; Sensors 2012; vol. 12; 21 pages.

Treuillet; "Outdoor/Indoor Vision-Based Localization for Blind Pedestrian Navigation Assistance"; WSPC/Instruction File; May 23, 2010; 16 pages.

Ran et al.; "Drishti: An Integrated Indoor/Outdoor Blind Navigation System and Service"; Proceeding PERCOM '04 Proceedings of the Second IEEE International Conference on Pervasive Computing and Communications (PerCom'04); 2004; 9 pages.

Wang, et al.; "Camera-Based Signage Detection and Recognition for Blind Persons"; $13^{th}$ International Conference (ICCHP) Part 2 Proceedings; Jul. 11-13, 2012; 9 pages.

Krishna et al.; "A Systematic Requirements Analysis and Development of an Assistive Device to Enhance the Social Interaction of People Who are Blind or Visually Impaired"; Workshop on Computer Vision Applications for the Visually Impaired; Marseille, France; 2008; 12 pages.

Lee et al.; "A Walking Guidance System for the Visually Impaired"; International Journal of Pattern Recognition and Artificial Intelligence; vol. 22; No. 6; 2008; 16 pages.

Ward et al.; "Visual Experiences in the Blind Induced by an Auditory Sensory Substitution Device"; Journal of Consciousness and Cognition; Oct. 2009; 30 pages.

Merino-Garcia, et al.; "A Head-Mounted Device for Recognizing Text in Natural Sciences"; CBDAR'11 Proceedings of the $4^{th}$ International Conference on Camera-Based Document Analysis and Recognition; Sep. 22, 2011; 7 pages.

Yi, Chucai; "Assistive Text Reading from Complex Background for Blind Persons"; CBDAR'11 Proceedings of the $4^{th}$ International Conference on Camera-Based Document Analysis and Recognition; Sep. 22, 2011; 7 pages.

(56) References Cited

OTHER PUBLICATIONS

Yang, et al.; "*Towards Automatic Sign Translation*"; The Interactive Systems Lab, Carnegie Mellon University; 2001; 5 pages.
Meijer, Dr. Peter B.L.; "*Mobile OCR, Face and Object Recognition for the Blind*"; The vOICe, www.seeingwithsound.com/ocr.htm; Apr. 18, 2014; 7 pages.
OMRON; Optical Character Recognition Sensor User's Manual; 2012; 450 pages.
Park, Sungwoo; "*Voice Stick*"; www.yankodesign.com/2008/08/21/voice-stick; Aug. 21, 2008; 4 pages.
Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.
Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.
Glover et al.; "*A Robotically-Augmented Walker for Older Adults*"; Carnegie Mellon University, School of Computer Science; Aug. 1, 2003; 13 pages.
OrCam; www.orcam.com; Jul. 22, 2014; 3 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Graft, Birgit; "*An Adaptive Guidance System for Robotic Walking Aids*"; Journal of Computing and Information Technology—CIT 17; 2009; 12 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Rodriquez-Losada et al.; "*Guido, The Robotic Smart Walker for the Frail Visually Impaired*"; IEEE International Conference on Robotics and Automation (ICRA); Apr. 18-22, 2005; 15 pages.
Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.
Kalra et al.; "*A Braille Writing Tutor to Combat Illiteracy in Developing Communities*"; Carnegie Mellon University Research Showcase, Robotics Institute; 2007; 10 pages.
Blaze Engineering; "*Visually Impaired Resource Guide: Assistive Technology for Students who use Braille*"; Braille 'n Speak Manual; http://www.blaize.com; Nov. 17, 2014; 5 pages.
AppleVis; *An Introduction to Braille Screen Input on iOS 8*; http://www.applevis.com/guides/braille-ios/introduction-braille-screen-input-ios-8, Nov. 16, 2014; 7 pages.
Dias et al.; "*Enhancing an Automated Braille Writing Tutor*"; IEEE/RSJ International Conference on Intelligent Robots and Systems; Oct. 11-15, 2009; 7 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
Trinh et al.; "*Phoneme-based Predictive Text Entry Interface*"; Proceedings of the 16th International ACM SIGACCESS Conference on Computers & Accessibility; Oct. 2014; 2 pgs.
Merri et al.; "*The Instruments for a Blind Teacher of English: The challenge of the board*"; European Journal of Psychology of Education, vol. 20, No. 4 (Dec. 2005), 15 pages.
Kirinic et al.; "*Computers in Education of Children with Intellectual and Related Developmental Disorders*"; International Journal of Emerging Technologies in Learning, vol. 5, 2010, 5 pages.
Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.
Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages.
Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16th International Symposium on Wearable Computers; pp. 166-167; 2012.
Singhal; "The Development of an Intelligent Aid for Blind and Old People;" *Emerging Trends and Applications in Computer Science (ICETACS)*, 2013 1st International Conference; pp. 182-185; Sep. 13, 2013.
Aggarwal.; "All-in-One Companion for Visually Impaired;" *International Journal of Computer Applications*; vol. 79, No. 14; pp. 37-40; Oct. 2013.
"Light Detector" *EveryWare Technologies*; 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Wu et al. "Fusing Multi-Modal Features for Gesture Recognition", Proceedings of the 15th ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10th USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.

\* cited by examiner

MODULAR ROBOT WITH SMART DEVICE

CROSS REFERENCE TO RELATED APPLICATION

This application is a continuation of U.S. application Ser. No. 14/634,523 entitled "Modular Robot with Smart Device," filed on Feb. 27, 2015, now U.S. Pat. No. 9,586,318, which is hereby incorporated by reference herein in its entirety.

BACKGROUND

1. Field

The present disclosure relates to wearable smart devices and more particularly to a wearable smart device configured to be attached to a robot for resource sharing between the device and the robot.

2. Description of the Related Art

Robots are increasing in popularity and potential applications. Robots may soon be performing tasks in our homes with increasing frequency. Many potential uses for robots, such as cooking and cleaning, require a lot of processing power. Some of this processing power is used for situational awareness and guidance features such as obstacle avoidance, detection of desired objects or the like. The processing power required and the software development for such situational awareness and guidance features, as well as other features of robots, can decrease the efficiency and increase the costs of robots.

Wearable smart devices having similar processing and memory capabilities as mobile phones are currently being introduced into the marketplace. These wearable smart devices have been steadily increasing in popularity and use. The processing and memory capabilities of these devices have been increasing, as have development of more complex and creative applications for them. Some of these wearable smart devices can include applications for providing navigation and situational awareness and other functions that may be similar to functions of robots.

Wearable smart devices are not always worn by the user. For example, a user of a wearable smart device may not wear the wearable smart device while at home for multiple reasons. Additionally, the wearable smart devices may not always be worn out of the house by the user, such as during short and frequently-taken excursions. As a result, the wearable smart device may sit idly by while a robot is maximizing its processing and memory capabilities within the home.

Thus, there is a need for systems and methods for a wearable smart device to be used with a robot to offer new and expanded capabilities and resource sharing.

SUMMARY

What is described is a wearable smart device configured to be positioned on and external to a robot having a robot sensor for sensing robot data and a robot input/output port. The wearable smart device includes a device sensor capable of detecting device data corresponding to an environment of the wearable smart device. The wearable smart device also includes a device input/output port. The wearable smart device also includes a device processor coupled to the robot sensor via the robot input/output port and the device input/output port. The device processor is also coupled to the device sensor and configured to control the robot based on the robot data and the device data.

Also described is a wearable smart device configured to operate with a robot having a robot processor and a robot input/output port. The wearable smart device includes a sensor configured to detect device data associated with an environment of the wearable smart device. The wearable smart device also includes a device input/output port. The wearable smart device includes a device processor coupled to the robot processor via the robot input/output port and the device input/output port. The device processor is also coupled to the sensor and configured to operate in tandem with the robot processor to control the robot based on the device data. The wearable smart device also includes a body configured to house the sensor, the device input/output port and the device processor and configured to be mechanically coupled to the robot.

Also described is a wearable smart device for use with a robot having a robot input/output port, a robot processor coupled to the robot input/output port and an actuator. The wearable smart device also includes a device input/output port and a device sensor configured to detect device data associated with an environment of the wearable smart device. The wearable smart device also includes a device processor coupled to the robot processor via the robot input/output port and the device input/output port, coupled to the device sensor. The device processor is configured to determine capabilities of the robot, determine a desired function to be performed by the robot and control the actuator so that the robot performs the desired function based on the device data and the capabilities of the robot.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The systems and methods disclosed herein provide a wearable smart device, a robot and systems and methods for resource sharing between them. The systems and methods provide several benefits and advantages such as allowing memory, processing, sensing, new and expanded capabilities and memory resources to be shared by the wearable smart device and the robot. Allowing resources to be shared by the wearable smart device and the robot provides several benefits and advantages such as reducing the cost of robots as their required processing and memory can be reduced and allowing a battery of the wearable smart device to be charged while the wearable smart device is performing useful functions. Allowing resources to be shared also provides benefits and advantages such as reducing idle time of the components of the wearable smart device, improved efficiency of the resources of both devices and having a modular system so that a single wearable smart device may be used with multiple robots and having higher quality and quantity of detected data as each device may include separate sensors so that data from each may be aggregated. The systems and methods also provide the benefit of the wearable smart device being capable of instructing the user to perform particular functions in order to achieve a goal (such as to get a glass of water) and instructing the robot to perform similar functions to achieve the same goal.

An exemplary system includes a robot and a wearable smart device. The robot includes sensors for detecting data in the robot's environment, a memory and a processor for determining goals of the robot and determining actions of the robot that may achieve the goals based on the detected data. The robot also includes a power unit for generating a power signal and an input/output port for allowing communications between the robot and the wearable smart device. The wearable smart device includes sensors for detecting data in the environment of the wearable smart device, a memory and a processor for performing functions such as situational guidance and awareness. The wearable smart device also includes a charging unit for receiving a power signal from the robot and an input/output port for connecting to the robot so that data may be shared between the sensors, memories and processors of the robot and the wearable smart device.

Figure 1A:
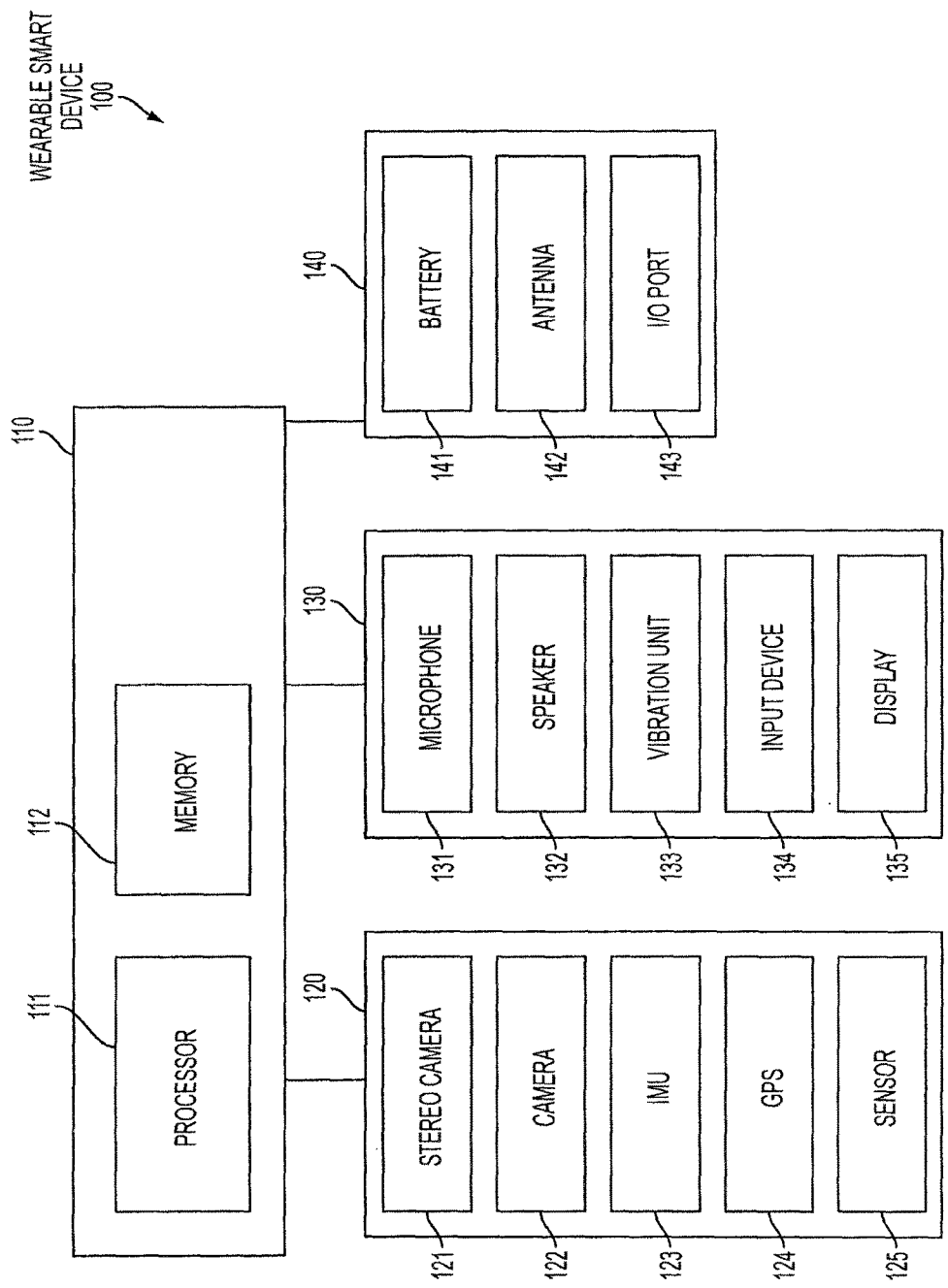
FIG. 1A is a block diagram of a wearable smart device according to an embodiment of the present invention.

In one implementation and with reference to FIG. 1A, a wearable smart device 100 includes an onboard processing array 110 which communicates with a sensor array 120, an interface array 130 and a component array 140. The onboard processing array 110, the sensor array 120, the interface array 130 and the component array 140 are exemplary groupings to visually organize the components of the wearable smart device 100 in the block diagram of FIG. 1A and are not limiting or necessarily representative of any physical groupings. In addition, certain implementations may have more or less components than illustrated in FIG. 1A.

The onboard processing array 110 includes a processor 111 and a memory 112. The processor 111 may be a computer processor such as an ARM processor, DSP processor, distributed processor or other form of central processing. The processor 111 may be positioned on the wearable smart device 100, may be a remote processor or it may be a pairing of a local and a remote processor.

The memory 112 may be one or any combination of the following: a RAM or other volatile or nonvolatile memory, a non-transitory memory or a data storage device, such as a hard disk drive, a solid state disk drive, a hybrid disk drive or other appropriate data storage. The memory 112 may further store machine-readable instructions which may be loaded into the memory 112 and executed by the processor 111. As with the processor 111, the memory 112 may be positioned on the wearable smart device 100, may be positioned remote from the wearable smart device 100 or may be a pairing of a local and a remote memory.

The sensor array 120 includes stereo cameras 121, a camera 122, an inertial measurement unit (IMU) 123, a global positioning system (GPS) 124 and a sensor 125. The stereo cameras 121 may be a stereo camera pair comprising two cameras offset by a stereo distance. The stereo distance may be optimized for the two cameras. The wearable smart device 100 may have more than one pair of stereo cameras 121. The camera 122 may be a camera or other optical sensor not part of a stereo camera pair. In some embodiments, the camera 122 may be positioned on an opposite side of the wearable smart device 100 from the pair of stereo cameras 121 and/or may be placed where needed, such as behind a user's neck to provide data for an area behind the user. In some embodiments, the stereo cameras 121 and/or the camera 122 may be capable of detecting image data of any light spectrum including, but not limited to, the visible light spectrum, the infrared spectrum, the near ultraviolet spectrum, etc.

The IMU 123 may be an IMU which may further comprise one or more of an accelerometer, a gyroscope, a magnetometer or the like. The GPS 124 may be one or more GPS units. The sensor 125 may be one or more sensors which provide further information about the environment in conjunction with the rest of the sensor array 120. The sensor 125 may be one or more of a camera, a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, a light sensor or other sensor.

The interface array 130 includes a microphone 131, a speaker 132, a vibration unit 133, an input device 134 and a display 135. The microphone 131 may be a microphone or other device capable of detecting sounds, such as voice activation/commands or other voice actions from the user, and may be integrated with or external to the wearable smart device 100.

The speaker 132 may be one or more speakers or other devices capable of producing sounds and/or vibrations. The vibration unit 133 may be a vibration motor or actuator capable of providing haptic and tactile output. In certain implementations, the vibration unit 133 may also be capable of producing sounds, such that the speaker 132 and the vibration unit 133 may be the same or integrated.

The input device 134 may be an input device such as a touch sensor and/or one or more buttons. For example, the input device 134 may be a plurality of buttons, such that each button corresponds to a different activity of the wearable smart device 100. In various embodiments, the microphone 131 may be considered an input device, such that the term "input device" may refer to the microphone, a button or buttons, a touchpad, a touchscreen or the like.

The display 135 may be a display integrated into the wearable smart device 100 or wirelessly connected to the wearable smart device 100. The display 135 may be capable of displaying visual data from the stereo cameras 121 and/or the camera 122. In other implementations, the display 135 may be another visual alert device, such as one or more LEDs or similar light source. In various embodiments, the input device 134 and the display 135 may be the same or integrated, such as a touchscreen.

The component array 140 includes a battery 141, an antenna 142 and an input/output port (I/O port) 143. The battery 141 may be a battery or other power supply capable of powering the wearable smart device 100. The battery 141 may have a connection port for recharging or may be wirelessly recharged, such as through induction charging. The antenna 142 may be one or more antennas capable of transmitting and receiving wireless communications. For example, the antenna 142 may be a Bluetooth or WiFi antenna, a radio frequency identification (RFID) antenna or reader and/or a near field communication (NFC) unit. The I/O port 143 may be one or more ports for connecting additional peripherals and/or communicating with other devices. For example, the I/O port 143 may be a headphone jack, a data port or the like.

The antenna 142 and/or the I/O port 143 allows the wearable smart device 100 to connect to another device or network for data downloads, such as updates to the smart necklace, map information or other relevant information for a particular application, and data uploads, such as status updates and updated map information. Further, the antenna 142 and/or the I/O port 143 allow the wearable smart device 100 to communicate with another device, such as a robot, so that the capabilities of the robot can be enhanced by the capabilities of the wearable smart device 100. For example, the wearable smart device 100 may perform processing for the robot, may perform object detection and recognition for the robot, may control the robot and/or the like.

The wearable smart device 100 described herein may be used as a stand-alone device or in conjunction with other smart devices. For example, smartphones, tablets or other mobile devices may wirelessly connect to the wearable smart device 100 for shared resources and processing. The mobile device may act as a display unit for the wearable smart device 100. The wearable smart device 100 may further have specific protocols for interacting with mobile devices or other smart necklaces. Additionally, the wearable smart device 100 may connect over the internet to remote processing and/or remote storage, such as a cloud.

The wearable smart device 100 includes one or more features allowing the wearable smart device 100 to be worn by a user such that the wearable smart device 100 will remain attached to the user during normal conditions (i.e., walking, riding in a car or bus, bending over, stretching or the like). In some embodiments, the wearable smart device 100 may be implemented as a necklace, an earpiece, eyeglasses, a smart watch, a smart clip or the like. The necklace may drape over a user's neck or shoulders, eyeglasses may rest on a user's nose and/or ears, the smart watch may be worn around a user's neck or wrist, the smart clip may be clipped onto the user or an article of clothing of the user, etc.

The wearable smart device 100 is capable of recognizing objects in its environment and determining feedback or instructions based on the recognized objects. For example, the wearable smart device 100 may be used by a blind person to aid in environmental awareness and situational guidance. The wearable smart device 100 may provide the user audio and/or haptic feedback through the speaker 132 and/or the vibration unit 133 based upon inputs including image data from the stereo cameras 121, image data from the camera 122 and/or audio data from the microphone 131.

In some embodiments, the wearable smart device 100 may be capable of providing instructions to a user based on input and/or detected data. For example, the wearable smart device 100 may be capable of providing instructions for a user to perform certain tasks such as getting a glass of water. The wearable smart device 100 may receive an instruction from the user indicating such a request. The wearable smart device 100 may then determine any actions required for the user to get a glass of water such as walk in a particular direction, open a particular cabinet, put the drinking glass under the faucet and the like and generate output based on these actions.

The wearable smart device 100 may also be coupled, physically and/or electrically, to a robot in order to enhance the capabilities of the robot. The use of the wearable smart device and the robot may be modular, such that that the wearable smart device 100 may be coupled to a plurality of robots, that the wearable smart device 100 may retain a variable amount of control over the robot based on the capabilities of the robot, etc. For example, a user may have more than one robot including a first robot for cooking, a second robot for vacuuming and a third robot for making the bed. The user may wear the wearable smart device 100 while the user is away from the house but may couple the wearable smart device 100 to any of the three robots based on a desired result. The wearable smart device 100 may be capable of providing sensors, processing, memory storage or the like to each robot so that each robot can better and more efficiently serve its purpose. This modularity can save money and time as the processing, sensing and/or memory functions of each robot may be at least partially provided by the wearable smart device 100.

In addition to providing instructions to a user for accomplishment of a goal (such as obtaining a glass of water as described above), the wearable smart device 100 may also be capable of instructing a robot to perform these actions. A robot may include wheels for motion, arms and/or end effectors for manipulating objects and the like. The wearable smart device 100 may be coupled to the robot and receive a requested goal from the user such as bringing a glass of water. Instead of providing instructions for the user to achieve the goal, the wearable smart device 100 may now cause the robot to perform similar actions to achieve the goal. In this regard, the wearable smart device 100 may be capable of providing instructions for either a user or a robot to achieve a particular goal.

The memory 112 may store map information or data to be used by the processor 111 in determining location information. The map data may be preloaded, downloaded wirelessly through the antenna 142, or may be visually determined, such as by capturing a building map posted near a building's entrance or built from previous encounters and recordings. The map data may be abstract, such as a network diagram with edges, or a series of coordinates with features. The map data may contain points of interest to the user and, as the user changes location, the stereo cameras 121 and/or cameras 122 may passively recognize additional points of interest and update the map data.

In certain locations such as indoor locations, the stand-alone GPS unit may not provide enough information to determine a very accurate location of the user. The wearable smart device 100 may use data detected from the stereo cameras 121, the camera 122, the IMU 123, the GPS 124, the sensor 125, the microphone 131 and/or the antenna 142 to determine an accurate location of the wearable smart device 100. The wearable smart device 100 may recognize, for instance, stairs, exits, and restrooms and appropriately store their location in the memory 112. Other stored location data may include descriptions of surrounding structures, alternate routes and other locations. Additional data and points of interest can be downloaded and/or uploaded to mobile devices, robots and other devices, social networks, or the cloud through Bluetooth or other wireless networks.

Figure 1B:
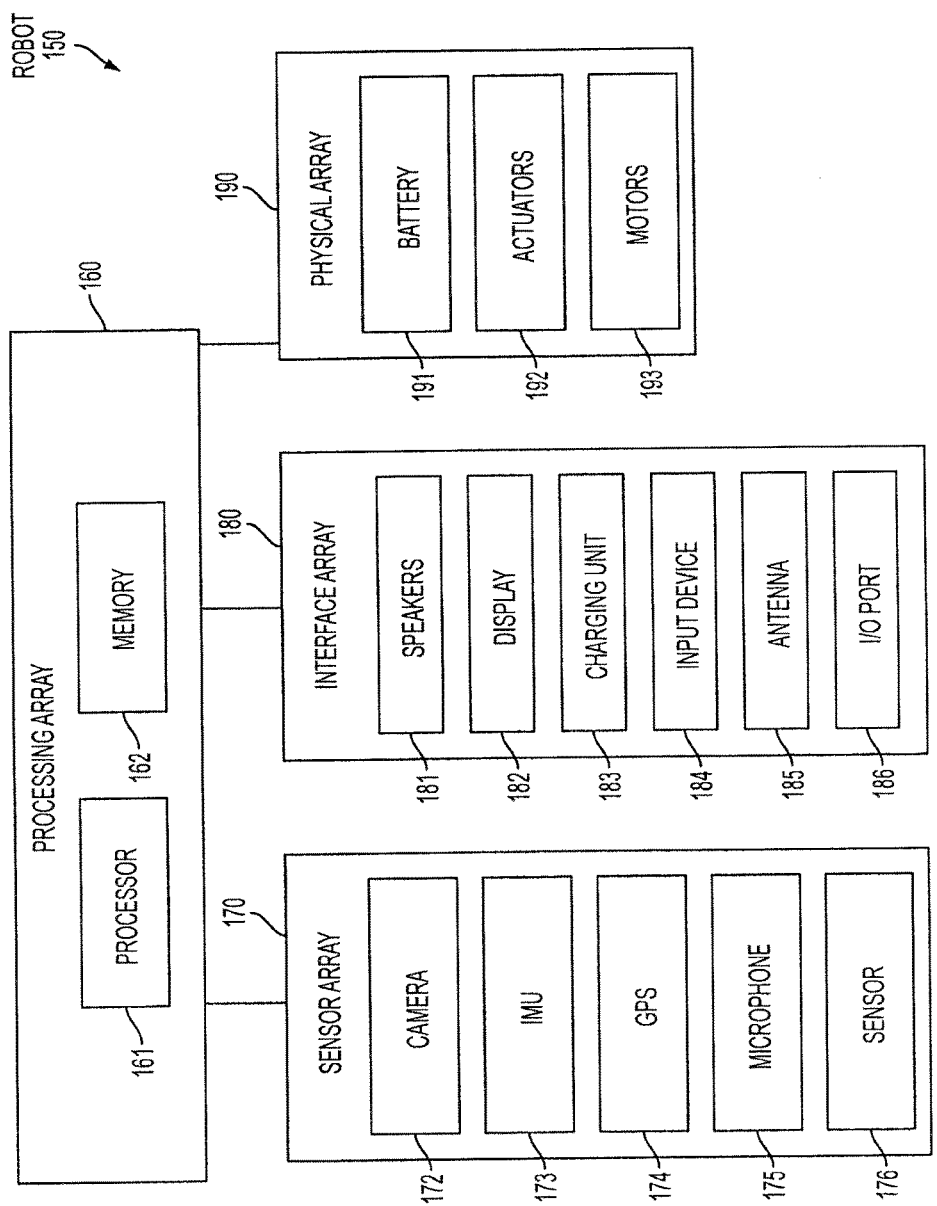
FIG. 1B is a block diagram of a robot configured to interface with a wearable smart device according to an embodiment of the present invention.

With reference to FIG. 1B, a robot 150 may include a processing array 160, a sensor array 170, an interface array 180 and a physical array 190. The processing array 160, the sensor array 170, the interface array 180 and the physical array 190 are exemplary groupings to visually organize the components of the robot 150 in the block diagram of FIG. 1B and are not limiting or necessarily representative of any physical groupings. In addition, certain implementations may include more or less components than illustrated in FIG. 1B.

The processing array 160 includes a processor 161 and a memory 162. The processor 161 may be any processor capable of performing logical operations such as an ARM processor, DSP processor, distributed processor or other forms of central processing. The processor 161 may control the operation of the robot 150 and may include multiple processors for controlling different portions of the robot 150. For example, auxiliary processors may be coupled to one or more of the actuators 192 of the robot 150 and a main processor may provide instructions to the auxiliary processors in order to control the entire robot 150. The processor 161 may be positioned on the robot 150, may be positioned remote from the robot 150 or it may be a pairing of a local and a remote processor.

The memory 162 may be one or any combination of the following: A RAM or other volatile or non-volatile memory, a non-transitory memory or data storage device, such as a hard disk drive, a solid state disk drive, a hybrid disk drive or other appropriate data storage. The memory 162 may further store-machine readable instructions which may be loaded into the memory 162 and executed by the processor 161. As with the processor 161, the memory 162 may be local, remote or a pairing of a local and remote memory.

The sensor array 170 includes a camera 172, and IMU 173, a GPS 174, a microphone 175 and a sensor 176. Each component of the sensor array 170 may operate in a similar manner as the corresponding component of the wearable smart device 100, however the sensors of each device may be different. For example, the camera 122 of the wearable smart device 100 may be a wide angle camera and the camera 172 of the robot 150 may be a narrow-scope camera.

The interface array 180 may include speakers 181, a display 182, a charging unit 183, an input device 184, an antenna 185 and an I/O port 186. The speakers 181, the display 182, the input device 184, the antenna 185 and the I/O port 186 may operate in a similar manner as the corresponding component of the wearable smart device 100 of FIG. 1A, however the actual components of each device may be different. For example, the wearable smart device 100 may include a touchscreen and the robot 150 may include a button as interface devices.

The charging unit 183 may be configured to provide a wireless and/or a wired charge to the wearable smart device 100. For example, the wearable smart device 100 may be positioned on or near the robot 150 and may receive a charge via the charging unit 183 of the robot 150. In some embodiments, the charging unit 183 may transmit and receive not only a wireless charging signal but also a data signal so that the robot 150 may communicate with the wearable smart device 100 via the charging unit 183. In some embodiments, the charging unit 183 may also be capable of receiving a charge from a wired or wireless power source and providing the charge to a battery 191 of the physical array 190.

The processor 161 may control the charging unit 183. For example, if the battery 191 is low on power, the processor 161 may determine the low power and prevent the charging unit 183 from distributing too much power to the wearable smart device 100. The processor 161 may also provide instructions causing the robot 150 to move to the location of the wired or wireless power source so that the battery 191 of the robot 150 can be recharged.

The physical array 190 may include the battery 191, actuators 192 and motors 193. The battery 191 is adapted to receive and store power and to distribute the power to components of the processing array 160, the sensor array 170, the interface array 180 and the physical array 190. The battery 191 may be any battery capable of receiving and storing a power.

The actuators 192 may be coupled to physical portions of the robot 150 capable of motion such as arms, end effectors, legs or the like and may be configured to cause the portion of the robot 150 to move. For example, an actuator may be coupled to an end effector of the robot 150. When the processor 161 determines that the end effector should flex, causing the end effector to grasp an object, the actuator coupled to the end effector may be caused to extend or retract, causing the end effector to grasp the object.

The robot 150 may include wheels or other components capable of rotational motion. The motors 193 may be coupled to these rotatable components and designed to generate rotational force (i.e., torque) based on received power. For example, the robot 150 may have wheels coupled to motors 193, and when the processor 161 determines that the robot 150 should move from a first location to a second location, the processor 161 may cause at least one of the motors 193 to begin generating torque that is then applied to the wheels.

Figure 2:
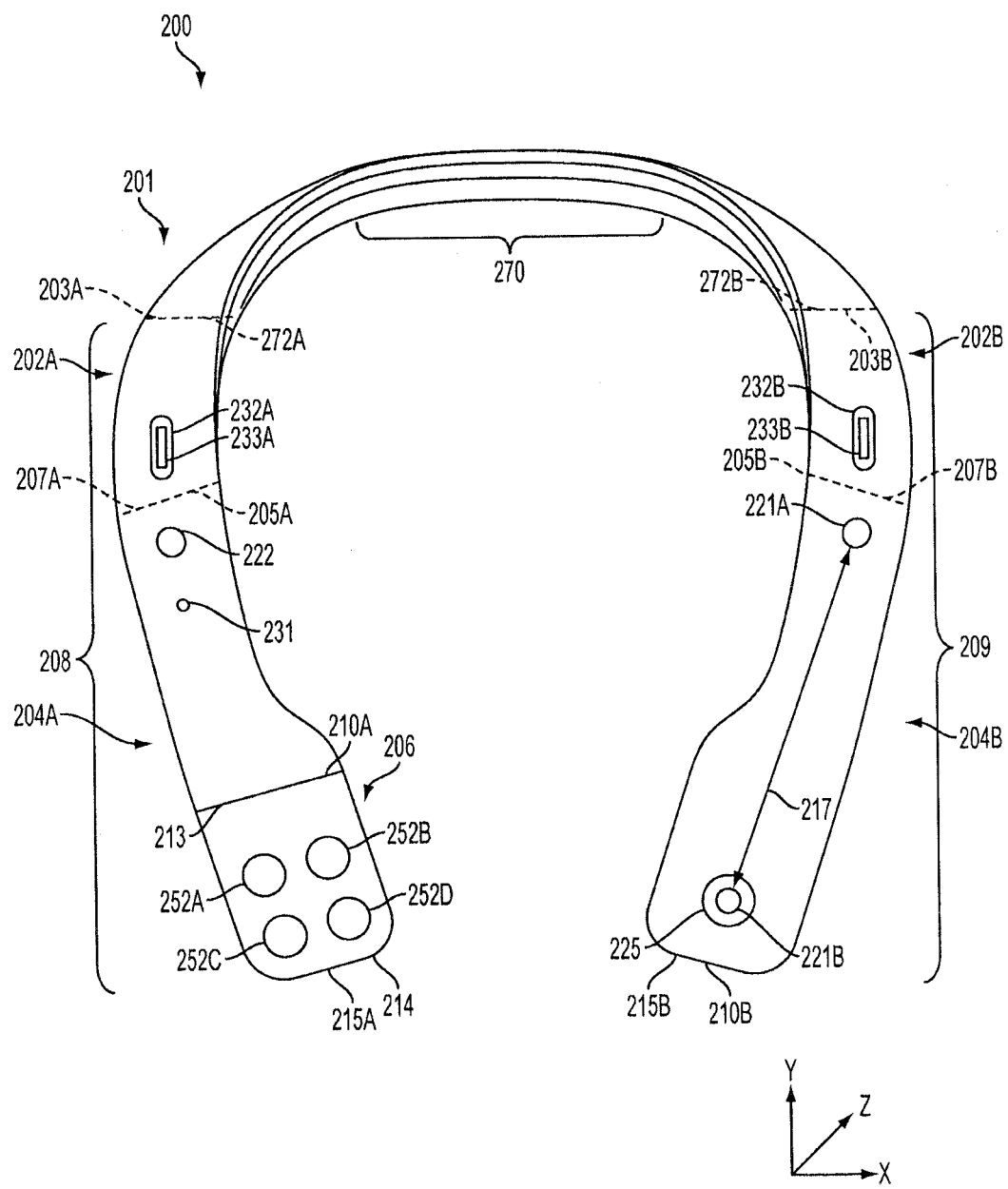
FIG. 2 illustrates a front view of a smart necklace according to an embodiment of the present invention.

In one implementation and with reference to FIG. 2, a smart necklace 200 (or blind aid necklace) may be considered a wearable smart device. One skilled in the art will realize that a wearable smart device can have shapes and configurations other than that illustrated in FIG. 2 or any other FIGS. An XYZ axis is shown to illustrate the shape and relative position of components of the smart necklace 200. In FIG. 2, the smart necklace 200 is shown from a front side of the smart necklace 200 (i.e., along the Z axis).

The smart necklace 200 includes an upper portion 201, a right portion 208 and a left portion 209. The smart necklace 200 is to be worn around a neck of a user. When worn, the upper portion 201 may rest on the back of a person's neck.

The right portion 208 may extend over the user's right shoulder such that a right end 215A of the smart necklace 200 is positioned on or above the user's right chest. Similarly, the left portion 209 may extend over the user's left shoulder such that a left end 215B of the smart necklace 200 is positioned on or above the left side of the user's chest.

The right portion 208 may include a right middle portion 202A, a lower right portion 204A, and a button portion 206. In some embodiments, the right portion 208 may not be separated into the right middle portion 202A, the lower right portion 204A and/or the button portion 206.

The upper portion may have a middle 270, a left end 272B and a right end 272A. The upper portion 201 may be substantially straight at the middle 270 and curved between the middle 270 and the right end 272A and the left end 272B such that the middle and lower portions may extend over the user's shoulder. The curve towards the left end 272B and the right end 272A may be such that the curves substantially mimic the user's neck and shoulders. This design allows the upper portion 201 to rest comfortably on the user's neck. The upper portion 201 may be rigid, meaning that the upper portion 201 will not bend or flex under normal pressure. This allows sensitive components such as batteries, processors, memories or the like to be housed in the upper portion 201 without concern of the components becoming damaged. The upper portion 201 may be at least partially hollow such that components may be housed within the upper portion 201.

Herein, if a component is positioned on a portion of the smart necklace, then the component may be internal with reference to the portion, the component may be partially internal and partially external with reference to the portion or the component may be external to and coupled to the portion.

The right middle portion 202A includes an upper end 203A coupled to the right end 272A of the upper portion 201 and a lower end 205A. The left middle portion 202B includes an upper end 203B coupled to the left end 272B of the upper portion 201 and a lower end 205B. The middle portions 202 may be permanently coupled to the upper portion 201 or they may be removably coupled to the upper portion 201. Removably coupled may include a connection sufficiently strong that the connection will not become disconnected during normal use.

The middle portions 202 may be curved. This allows the middle portions 202 to rest against the user's neck and/or shoulders. In some embodiments, the middle portions 202 may be constructed of a semi-rigid material, such as rubber, silicone or the like. The semi-rigid material may bend or flex under certain forces but will return to its original shape when the force has been removed. The semi rigid material may allow the middle portions 202 to conform to the contours of a user's shoulders. Thus, the semi rigid material of the middle portions 202 allows the smart necklace 200 to comfortably fit users and/or robots having different shapes.

The right middle portion 202A may include a speaker 232A and a vibration unit 233A. The left middle portion 202B similarly may include a speaker 232B and a vibration unit 233B. By providing a speaker and/or a vibration unit on both sides of the user, stereo information can be provided to the user.

The lower right portion 204A includes an upper end 207A coupled to the lower end 205A of the right middle portion 202A and a lower end 210A. The lower right portion 204A may be permanently coupled to the right middle portion 202A or may be removably coupled to the right middle portion 202A.

The lower right portion 204A may be substantially straight. Proximal to the right end 215A, the lower right portion 204A may become larger in the X direction. This provides additional surface area for components, such as buttons, to be positioned towards the right end 215A of the smart necklace. The lower right portion 204A may be constructed of a rigid material. The rigid material may be at least partially hollow or contain a cavity such that components may be housed within the lower right portion 204A. The lower right portion 204A may include a camera 222 and a microphone 231.

The lower left portion 204B includes an upper end 207B coupled to the lower end 205B of the left middle portion 202B and a lower end 210B that is the same as the left end 215B of the smart necklace 200. The lower left portion 204B may be permanently coupled to the left middle portion 202B or may be removably coupled to the left middle portion 202B.

The lower left portion 204B may be similar to the lower right portion 204A. The lower left portion 204B may become larger in the X direction as it approaches the left end 215B. This may provide a greater surface area for additional externally-mounted components and/or a greater volume for housing internal components. The lower left portion 204B may be constructed of a rigid material and be at least partially hollow such that components may be housed within the lower left portion 204B.

The lower left portion 204B may include a pair of stereo cameras 221. A stereo camera 221A may be positioned proximal to the left middle portion 202B while another stereo camera 221B is positioned proximal to the left end 215B. The pair of stereo cameras 221 may be separated from each other by a distance 217. The distance 217 may be selected based upon an optimal range. For example, if it is determined that depth information is most important between 5 and 10 feet, the distance 217 may be smaller than if depth information were most important between 10 and 15 feet.

The lower left portion 204B may also include a light sensor 225 coupled to the stereo cameras 221A and 221B and/or the camera 222. In various embodiments, a single device may comprise the light sensor 225 and the stereo camera 221B. Coupling between the cameras and the light sensor 225 may allow each camera to adjust its sensitivity to light based on an ambient amount of light sensed by the light sensor 225. In various embodiments, the processor may be coupled to the light sensor 225 such that the processor may adjust image data received from the cameras based on the detected ambient light.

Between the lower right portion 204A and the right end 215A may be a button portion 206. The button portion 206 has an upper end 213 coupled to the lower end 210A of the lower right portion 204A and a lower end 214 that is the same as the right end 215A of the smart necklace 200.

The lower right portion 204A may be permanently coupled to the button portion 206 or may be removably coupled to the button portion 206. In various embodiments, the lower right portion 204A and the button portion 206 are a single portion and/or the button portion 206 may simply be an extension of the lower right portion 204A. In various embodiments, the button portion 206 is removable such that a new or updated button portion may be attached to the smart necklace 200. In this manner, functionality may be added to the smart necklace 200 by inclusion of the new button portion. The button portion 206 may be at least partially hollow and constructed of a rigid material and the button portion may house components. The button portion 206 may include at least one button or other input device 252. The input device 252 may be used by a user to select modes of operation of the smart necklace 200, to change settings of the smart necklace 200 or the like.

Figure 3:
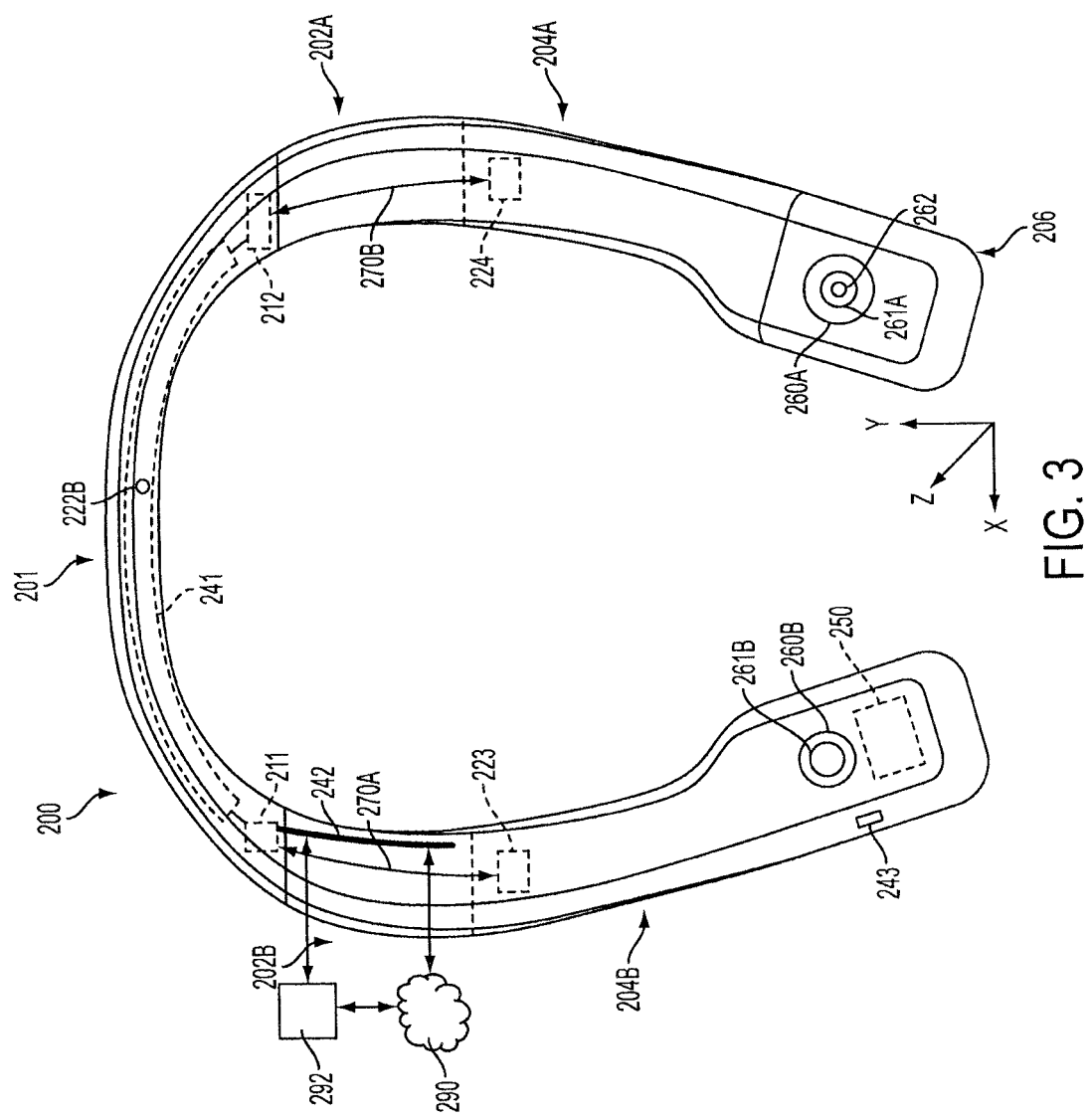
FIG. 3 illustrates a rear view of the smart necklace of FIG. 2 according to an embodiment of the present invention.

FIG. 3 illustrates the smart necklace 200 of FIG. 2 from the back or rear (i.e., along the Z axis). In FIG. 3, the smart necklace 200 is illustrated from the opposite side of the Z axis than illustrated in FIG. 2.

The upper portion 201 of the smart necklace may include a battery 241. In various embodiments, the battery 241 may be centered within the upper portion 201 on the X axis. The battery 241 may be coupled to all of the electronic devices within the smart necklace 200 so that the battery can provide power to all electrical components within the smart necklace 200.

The upper portion 201 may also include a processor 211. The processor 211 may be coupled to all electronic components of the smart necklace 200 and adapted to receive inputs and provide outputs from/to the electronic components.

The upper portion 201 may also include a memory 212. The memory 212 may be coupled to the processor 211 such that the processor 211 can store and retrieve data from the memory 212. The memory 212 and the processor 211 may be positioned on the same side or on opposite sides of the upper portion 201. It is preferred that weight distribution of the upper portion 201 is centered in the middle of the upper portion 201 along the X direction. This will cause the weight of the upper portion 201 to be evenly distributed on the user, increasing the comfort of the smart necklace 200 and the likelihood of the smart necklace 200 remaining positioned on a robot.

The upper portion 201 may include a camera 222B capable of detecting image data of any light spectrum including, but not limited to, the visible light spectrum, the infrared spectrum, the near ultraviolet spectrum, etc. The camera 222B may be adapted to detect image data behind a user.

The lower left portion 204B may include an indent 260A, a connector 261A, a charging contact 262 and a GPS 224 that is similar to the GPS 124. In various embodiments, the charging contact 262 may be positioned within the indent 260. The charging contact 262 may be coupled to the battery 241 such that the charging contact 262 receives power and transfers that power to the battery 241 for storage. The charging contact 262 may be adapted to receive power via magnetic charging, inductive charging, direct charging or the like. In various embodiments, the charging contact 262 may be coupled to the processor 211 such that electronic data may be transferred via the charging contact 262 in addition to or instead of power.

The connector 261A may be adapted to physically couple the smart necklace 200 to another device such as a charging dock, a robot or the like. The connector 261A may include a snap connector, a press-fit connector, a magnetic connector or any other type of connector capable of physically connecting the smart necklace 200 to another device having a similar type of connector. When the smart necklace 200 is connected to another device via the connector 261A, the smart necklace 200 may not become removed with normal use. For example, if the other device is a robot, normal movement of the robot (i.e., movement that the robot is expected to perform) will not cause the smart necklace 200 to become disconnected. The connector 261A may be positioned within the indent 260A or separate from the indent 260A.

The lower right portion 204A may include a wireless charging module 250, a connector 261B, an indent 260B similar to the indent 260A, an IMU 223 that is similar to the IMU 123 and an I/O port 243 that is similar to the I/O port 143. The wireless charging module 250 may be capable of receiving a wireless charging signal. Accordingly, the wireless charging module 250 may be coupled to the battery 241 such that the wireless charging module 250 may propagate the power received from the wireless charging signal to the battery in a form in which the battery 241 can store and/or use the power. In some embodiments, the wireless charging module 250 may also be capable of receiving and transmitting a data signal such that the wireless charging module 250 may receive a wireless charging signal and a wireless data signal as well as transmit a wireless data signal. In these embodiments, the wireless charging module 250 may be coupled to the processor 211 such that data signals are transmitted to and received from the processor 211.

The connector 261B may be similar to the connector 261A. In some embodiments, only the connector 261A or the connector 261B may be present. In embodiments in which both connector 261A and 261B are present, the physical connection of the smart necklace 200 to another device may be strengthened by the presence of two connectors instead of one.

The middle portions 202 may or may not include components in addition to those illustrated in FIG. 2. If no additional components are present in the middle portions 202, a connection 270A and a connection 270B may exist within the middle portions 202 in order to electrically couple the lower portions 204 to the upper portion 201. The connections 270A and 270B may include a data bus, a power line, or any other electrical connection. In some embodiments, the connections 270A and 270B may be replaced with wireless connectivity between the lower portions 204 and the upper portion 201.

The smart necklace 200 may have an antenna 242 extend into the left middle portion 202B. The antenna 242 may be coupled to the processor 211 such that the processor 211 may transmit and receive wireless signals via the antenna 242.

The antenna 242 may be wirelessly coupled to a device or devices remote from the smart necklace 200, such as a cloud 290, a mobile device 292, a laptop, a tablet, a robot or the like. In various embodiments, the cloud 290 may include storage and/or processing that the smart necklace 200 may utilize. For example, the smart necklace 200 may transmit certain data to the cloud 290 such that the cloud stores the data or processes the data. The smart necklace 200 may later retrieve the stored and/or processed data from the cloud 290. In various embodiments, the smart necklace 200 is designed to perform some functions locally, such as by the processor 211, and is designed such that other functions are performed remotely, such as by the cloud 290.

The mobile device 292 may be coupled to the smart necklace 200 such that the mobile device 292 may perform some processing and storage functions for the smart necklace 200. The mobile device 292 may also be connected to the cloud 290 such that the mobile device 292 may perform some storage and/or processing functions and transmit additional storage and/or processing functions to the cloud 290. In various embodiments, processing and/or storage may be performed by any combination of the smart necklace 200, the mobile device 292 and the cloud 290.

Figure 4:
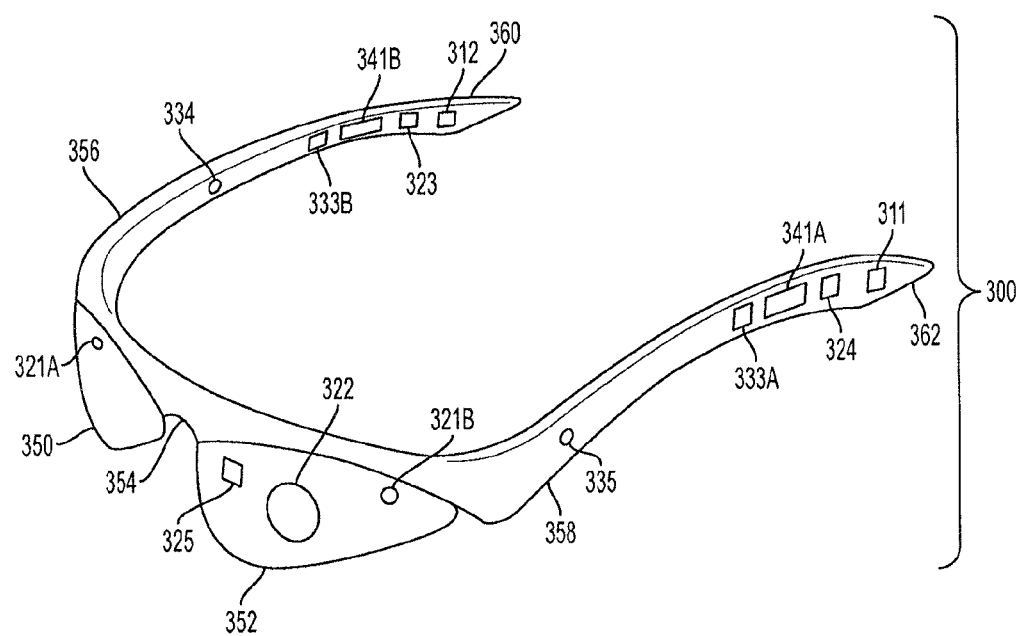
FIG. 4 illustrates a front view of smart eyeglasses according to an embodiment of the present invention.

With reference now to FIG. 4, a wearable smart device may also include smart eyeglasses 300. The smart eyeglasses 300 may include a right temple 356 configured to rest on a user's right ear and having a right temple tip 360, a left temple 358 adapted to rest on a user's left ear and having a left temple tip 362 and a bridge 354 that may be positioned on a user's nose for additional support.

The smart eyeglasses 300 include similar components as the smart necklace 200. For example, the smart eyeglasses 300 include a processor 311 and a memory 312 similar to the processor 211 and the memory 212. The smart eyeglasses 300 further include a pair of stereo cameras 321, a wide angle camera 322, an IMU 323, a GPS 324 and a sensor 325 having similar capabilities as the corresponding components of the smart necklace 200. The stereo camera 321B, the camera 322 and the sensor 325 are positioned on a left lens 352 and the stereo camera 121A is positioned on a right lens 350.

The smart eyeglasses 300 further include a first vibration unit 333A and a second vibration unit 333B capable of providing haptic and audio feedback. An input device, such as a button, is positioned on the right temple 156 and a display, such as an LED, is positioned on the left temple 158. The smart eyeglasses 300 include a first battery 141A on the left temple 358 and a second battery 141B on the right temple tip 356 in order to evenly distribute the weight of the components.

A wearable smart device is a device that includes at least one sensor, a processor and has a shape such that it is capable of being attached to a user without an intermediate device. The smart necklace 200 includes multiple sensors, the processor 211 and has a shape such that it can be attached to the user by draping over the user's neck. The smart eyeglasses 300 include multiple sensors, the processor 311 and have a shape such that it can be attached to the user by resting on the user's ears and nose. Accordingly, the smart necklace 200 and the smart eyeglasses 300 are wearable smart devices.

Figure 5:
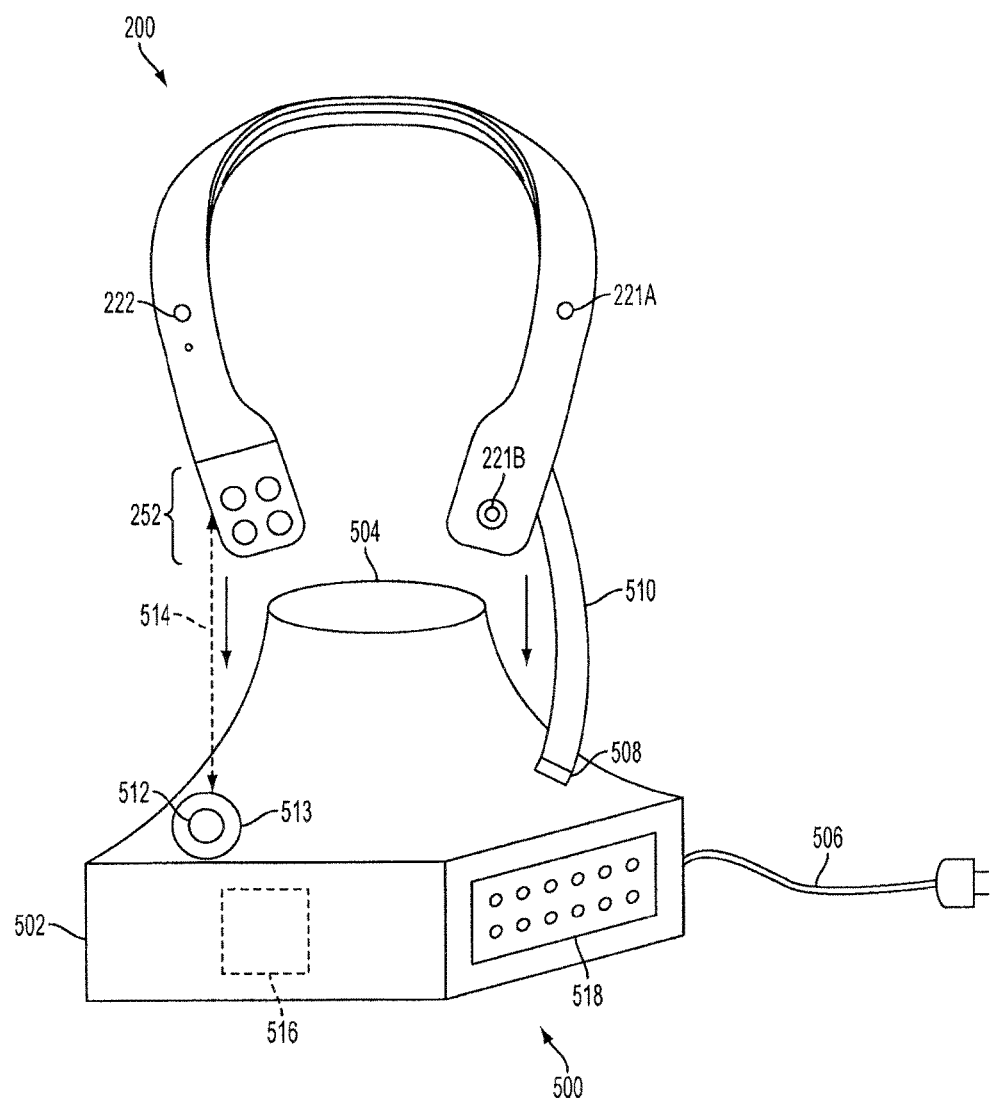
FIG. 5 illustrates a charging unit robot configured to operate with a wearable smart device according to an embodiment of the present invention.

With reference now to FIG. 5, a charging unit 500 may function as a robot. The charging unit 500 may include a base 502 and a neck 504. The base 502 may rest on a surface such as a counter, a table, a floor or the like, remain in an upright position due to the shape of the base 502 and support the neck 504 and/or a wearable smart device such as the smart necklace 200. The neck 504 may extend upward from the base 502 and may have a shape similar to a user's neck. The neck 504 may have a shape and size such that the smart necklace 200 may be attached to the charging unit 500 by being positioned on the neck 504. In this manner, the smart necklace 200 can be attached to the neck 504 in a similar manner as it would a person's neck. The charging unit 500 is illustrated as being compatible with the smart necklace 200; however one skilled in the art will realize that the charging unit 500 may be capable of operating with any wearable smart device.

In addition to attachment via the shape of the smart necklace 200, the smart necklace 200 may also attach to the charging unit 500 via a connector 513 that may be similar to the connector 260A. The wireless charging unit 512 may be capable of generating a power signal and transmitting the power signal to the smart necklace 200 via the charging contact 262 of the smart necklace 200 either wirelessly or by contact. In some embodiments, the wireless charging unit 512 may also be capable of transmitting and receiving data signals from the charging contact 262. When the smart necklace 200 is positioned about the neck 504, the upper portion 201 of the smart necklace 200 may rest against a portion of the neck 504 and the right portion 208 and left portion 209 may drape around the neck 504 and rest on a portion of the neck 504 and/or a portion of the base 502. The connector 261A and the charging contact 262 may be positioned adjacent the connector 513 and the wireless charging unit 512 so that the connectors assist in keeping the smart necklace 200 in place and the wireless charging unit 512 can transmit a power signal to the charging contact 262.

The charging unit 500 may include a processor 516 that is capable of performing certain processing functions independently or in conjunction with the smart necklace 200. For example, the charging unit 500 may be coupled to remotely-controllable smart devices within a user's home such as a stove, a temperature control unit, a TV or the like. When the smart necklace 200 is coupled to the charging unit 500, the processor 516 may receive information from the smart stove or the other smart devices regarding their current states. The charging unit 500 may also receive detected data from the smart necklace 200 such as whether the user is in the same room as the charging unit 500 and the smart necklace 200. If it is determined by the processor 516 that the user has not been present in the room for a predetermined amount of time and a state of one of the smart devices is such that it should be changed when the user is not nearby, the processor 516 may instruct the smart device to change states to the desired state (i.e., from "on" to "off.")

The charging unit 500 may also include a speaker 518. The speaker 518 may be coupled to the processor 516 and configured to provide audio output to the user. For example, if the smart necklace 200 detects that a user is asleep but has an upcoming appointment, the processor 516 may determine output data to be output by the speaker 518 informing the user that the appointment is upcoming.

The charging unit 500 may include a plug in cable 506 capable of receiving a power signal from an electrical outlet such that the charging unit 500 can transmit a wireless power signal based on the received power signal.

The charging unit 500 may include an I/O port 508 capable of transmitting and/or receiving data from the smart necklace 200. As illustrated in FIG. 5, the I/O port 508 is adapted to receive a cable 510 coupled to the smart necklace 200 such that the I/O port 508 may transmit and receive data from the smart necklace 200 via the cable 510. In some embodiments, the I/O port 508 may be adapted to transmit and receive data via a wireless protocol and an antenna.

Figure 6:
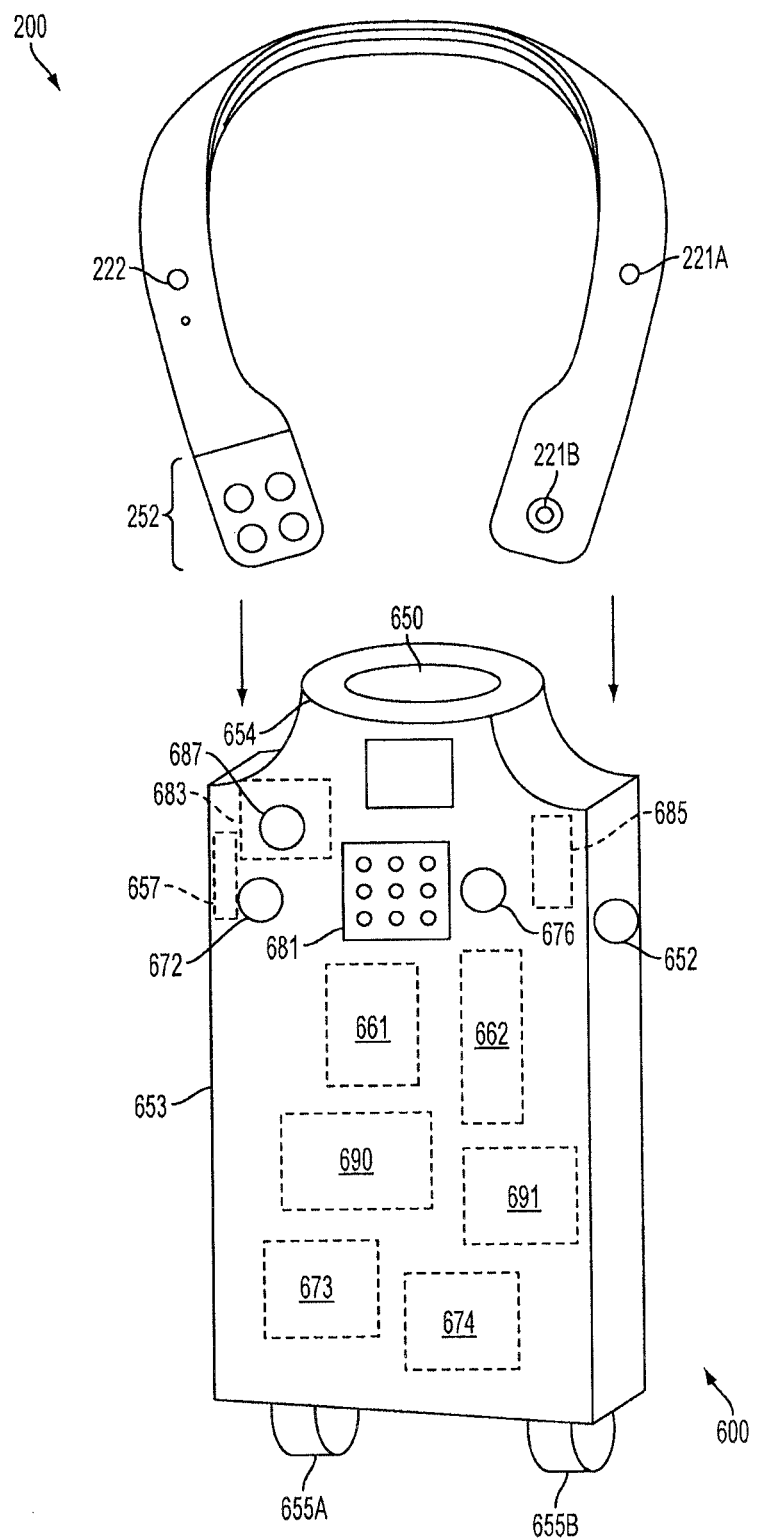
FIG. 6 illustrates a mobile robot base configured to operate with a wearable smart device according to an embodiment of the present invention.

With reference now to FIG. 6, a mobile robot base 600 may be configured to operate in conjunction with a wearable smart device such as the smart necklace 200. The mobile robot base 600 may include a processor 661, a memory 662, a camera 672, an IMU 673, a GPS 674, a microphone 675, a sensor 676, a body 653 and a neck 654. The shape of the body 653 and/or the neck 654 may be such that the smart necklace 200 can be attached to the mobile robot base 600 by being positioned around the neck 654 in a similar manner as it would on a person. In some embodiments, the smart necklace 200 may be positioned on the mobile robot base 600 in a different manner and/or the mobile robot base 600 may be configured to receive another wearable smart device such as the smart eyeglasses 300.

The camera 672, the IMU 673, the GPS 674, the microphone 675 and the sensor 676 may be capable of functioning as described with reference to the similar components of FIG. 1B.

The processor 661 may determine goals to be performed by the mobile robot base 600 such as by data stored in the memory 662 and/or the memory 212 or by data detected by sensors of the mobile robot base 600 and/or the smart necklace 200. The processor 661 may also be configured to receive data detected by one or more of the camera 672, the IMU 673, the GPS 674, the microphone 675 and the sensor 676 and determine actions to be performed based on the received data. For example, the processor 661 may determine that the mobile robot base 600 should move forward or backward based on the detected data and a goal and, in turn, the processor 661 may instruct the motors coupled to the first wheel 655A and the second wheel 655B to begin generating torque. The processor 661 may be capable of transmitting data to and/or receiving data from the processor 211 of the smart necklace 200 so that processing may be performed by a combination of the processor 211 and the processor 661.

In some embodiments, the processor 211 of the smart necklace 200 may determine goals of the mobile robot base 600 and transmit instructions to the motors and/or the processor 661 of the mobile robot base 600 based on a goal and data detected by sensors of the smart necklace 200 and/or the mobile robot base 600. In some embodiments, the smart necklace 200 may determine the capabilities of the mobile robot base 600 such that the instructions are also based on the capabilities of the mobile robot base. In some embodiments, the mobile robot base 600 may not include a processor such that all actions performed by the mobile robot base 600 are determined by the processor 211 of the smart necklace 200.

The memory 662 may store machine-readable instructions to be performed by the processor 661. In some embodiments, the memory 662 may be accessible by the processor 211 and the memory 212 may be accessible by the processor 611 such that memory may be shared between the mobile robot base 600 and the smart necklace 200.

The mobile robot base 600 may also include a speaker 681, a charging unit 683, a charging contact 687 and an antenna 685. The speaker 681 may be capable of outputting audio data based on signals received from the processor 661 or the processor 211. The antenna 685 may be coupled to the processor 661 and capable of transmitting and/or receiving data from the smart necklace 200.

The charging unit 683 may be capable of transmitting and/or receiving a power signal via contact or a wireless charging signal. When the smart necklace 200 is positioned on the mobile robot base 600, the charging contact 687 may align with the charging contact 262. The charging unit 683 and/or the charging contact 687 may be coupled to a battery 691 of the mobile robot base 600 that is capable of storing power. The processor 661 of the mobile robot base 600 may be capable of controlling operation of the charging unit 683 based on a power status of the mobile robot base 600 and/or the smart necklace 200.

The mobile robot base 600 may include a second charging unit 690 capable of receiving a power signal and transferring the power to the battery 691 and other components of the mobile robot base 600. The second charging unit 690 may be capable of receiving a charge from a wall outlet or wireless power transmitting unit. In some embodiments, only one of the charging unit 638 or the second charging unit 690 may be present and may perform the functions of both.

The mobile robot base 600 may also include one or more connectors such as the socket 652 and the socket 657 that are capable of connecting the mobile robot base 600 to an accessory such as an arm. The mobile robot base 600 may also include a socket 650 capable of connecting the mobile robot base 600 to a neck, a head or another accessory. The sockets may couple the mobile robot base 600 to the accessories mechanically and/or electronically. When the accessories are coupled to the mobile robot base, the accessories may be controlled by the processor 211 and/or the processor 611.

When the smart necklace 200 is coupled to the mobile robot base 600, sensed data may be shared between them. As an example, the processor 211 of the smart necklace 200 may contain control instructions for controlling the operation of the mobile robot base 600. The camera 672 and the sensor 676 of the mobile robot base 600 may detect data associated with the surrounding environment and share the detected data with the processor 211. The processor 211 may then control the mobile robot base 600 based on the data detected from the mobile robot base 600 and the smart necklace 200.

Figure 7:
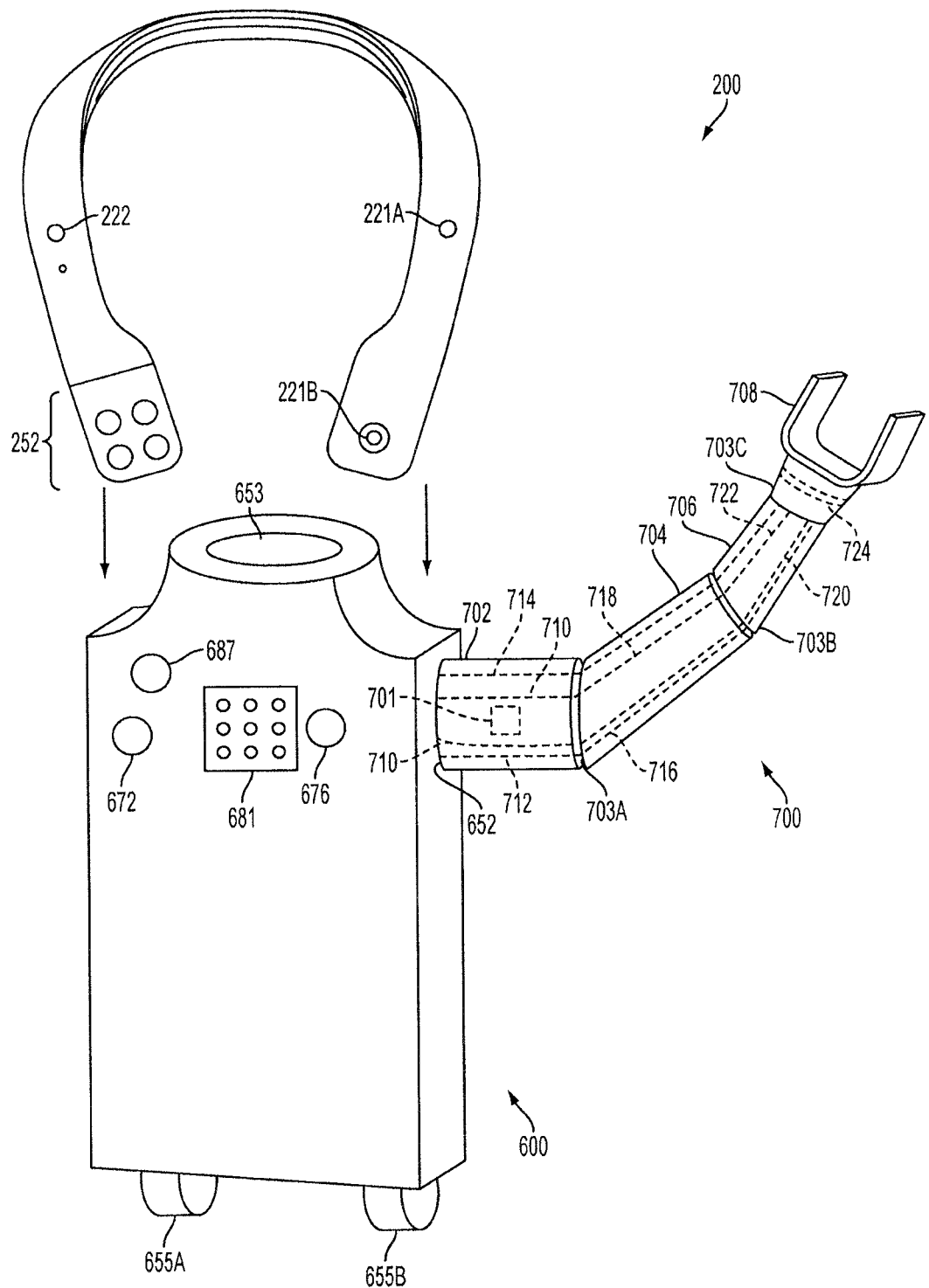
FIG. 7 illustrates the mobile robot base having a robot arm and coupled to the smart necklace of FIG. 2 according to an embodiment of the present invention.

With reference now to FIG. 7, the mobile robot base 600 may be coupled to an attachment such as an arm 700. The arm 700 may include a connector 701 configured to couple the arm 700 to the socket 652 of the mobile robot base 600. The connector 701 and/or the socket 652 may be any type of connector such as snap fit, press it, rotating lock, magnetic or the like. When the arm 700 is coupled to the mobile robot base 600 via the connector 701 and the socket 652, the arm 700 will remain coupled to the mobile robot base 600 during normal operations of the mobile robot base 600 and the arm 700.

The arm 700 may include a first section 702, a second section 704, a third section 706 and an end effector 708. The first section 702, the second section 704, the third section 706 and the end effector 708 may be coupled together via joints 703A, 703B and 703C respectively. Each section of the arm 700 may include actuators capable of causing each portion to move relative to the mobile robot base 600 and the other portions. For example, the first section 702 includes a first actuator 712 and a second actuator 714 capable of allowing the first section 702 to move relative to the mobile robot base 600 and/or the second section 704. Similarly, the second section 704 may include a first actuator 716 and a second actuator 718, the third section 706 may include a first actuator 720 and a second actuator 722 and the end effector 708 may include an actuator 724.

The arm 700 may include a processor 710 capable of controlling each actuator of the arm 700 in order to cause the arm 700 to move in a specific manner. The new capability of the mobile robot base 600 may be detected by the processor 661 and/or the processor 211 which may determine additional goals and/or functionality based on the properties of the arm 700. The processor 710 may be coupled to the processor 661 of the mobile robot base 600 and/or the processor 211 of the smart necklace 200 such that the processor 661 and/or the processor 211 can control the arm 700 via the processor 710. In some embodiments, the actuators may be controlled by processor 661 and/or the processor 211 without the processor 710 being present.

Figure 8:
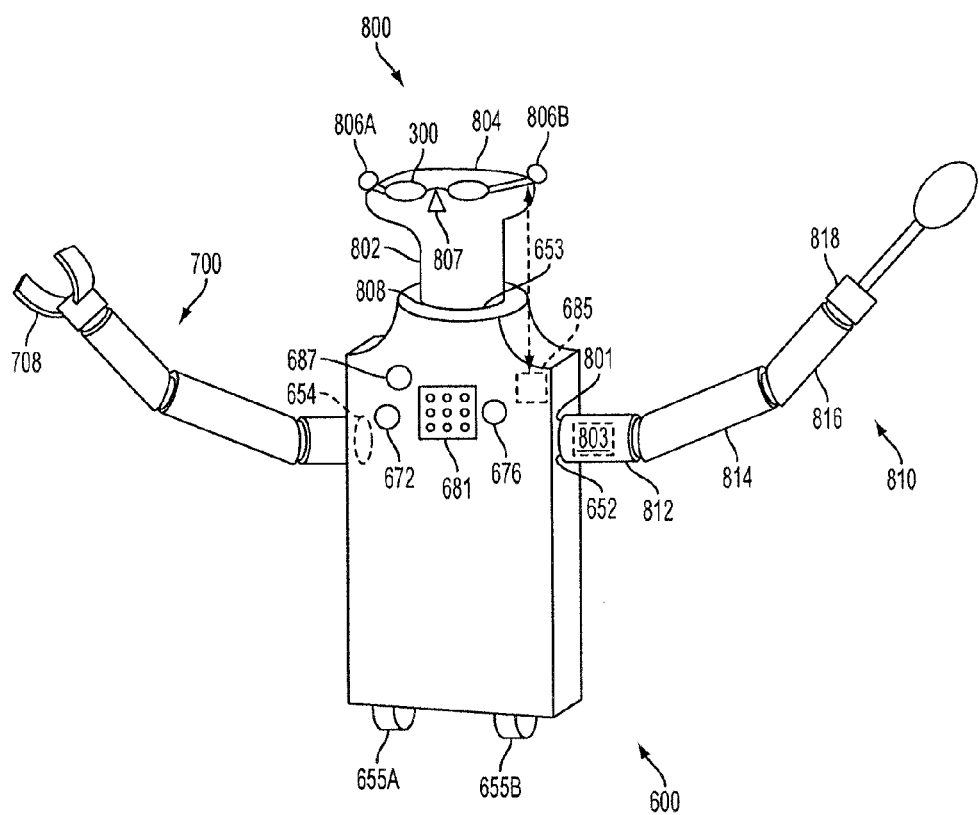
FIG. 8 illustrates the mobile robot base having robot arms, a head attachment and the smart eyeglasses of FIG. 3 according to an embodiment of the present invention.

With reference to FIG. 8, the mobile robot base 600 is now coupled to the arm 700, an arm 810 and a head attachment 800. The arm 700 is now coupled to the socket 657 instead of the socket 652. The arm 810 is coupled to the socket 652 via a connector 801 that is similar to the connector 701 of the arm 700. The arm 810 includes a first portion 812, a second portion 814, a third portion 816 and a spoon attachment 818, each coupled by joints similar to the joints of the arm 700. Each portion of the arm 810 may include actuators similar to the actuators of the arm 700. The arm 810 may include a processor 803 capable of controlling the movement of each actuator in order to cause a specific movement of the arm 810.

The head attachment 800 may be coupled to the mobile robot base 600 via a connector 808 and the socket 650. The connector 808 and the socket 650 may be any type of connectors capable of coupling the head attachment 800 to the mobile robot base 600. The head attachment 800 may include a neck 802 and a head 804. The head 804 may have a shape particularly suited to receive a wearable mobile device such as the smart eyeglasses 300. In this manner, the smart eyeglasses 300 may be attached to the head attachment 800 in a similar manner as they would be on a person. In order to strengthen the attachment between the head 804 and the smart eyeglasses 300, the head 804 may include an ear 806A, an ear 806B and a nose 807 configured to receive relevant portions of the smart eyeglasses 300. In this manner, the smart eyeglasses 300 may be attached to the head attachment 800 in a similar manner as they would be on a person.

In some embodiments, components of the mobile robot base 600 may be adapted to communicate with components of the smart eyeglasses 300 via the antenna 685 and an antenna of the smart eyeglasses 300. In some embodiments, instead of or in addition to the wireless connection, a physical connection may exist between the smart eyeglasses 300 and the mobile robot base 600 via a wire or other electronic connection through the head attachment 800.

The smart eyeglasses 300 may operate in tandem with the processor 661 of the mobile robot base 600 in a similar manner as the smart necklace 200 operates with the mobile robot base 600. The head attachment 800 may include additional sensors other than those of the mobile robot base 600 such that the head attachment 800 may increase the robustness of detected data. As was the case with the configuration illustrated in FIG. 7, the processor 311 and/or the processor 661 may determine the additional capabilities of the robot illustrated in FIG. 8 and may control the robot based on goals, data detected from the robot and the smart eyeglasses 300 and the capabilities of the robot.

Figure 9:
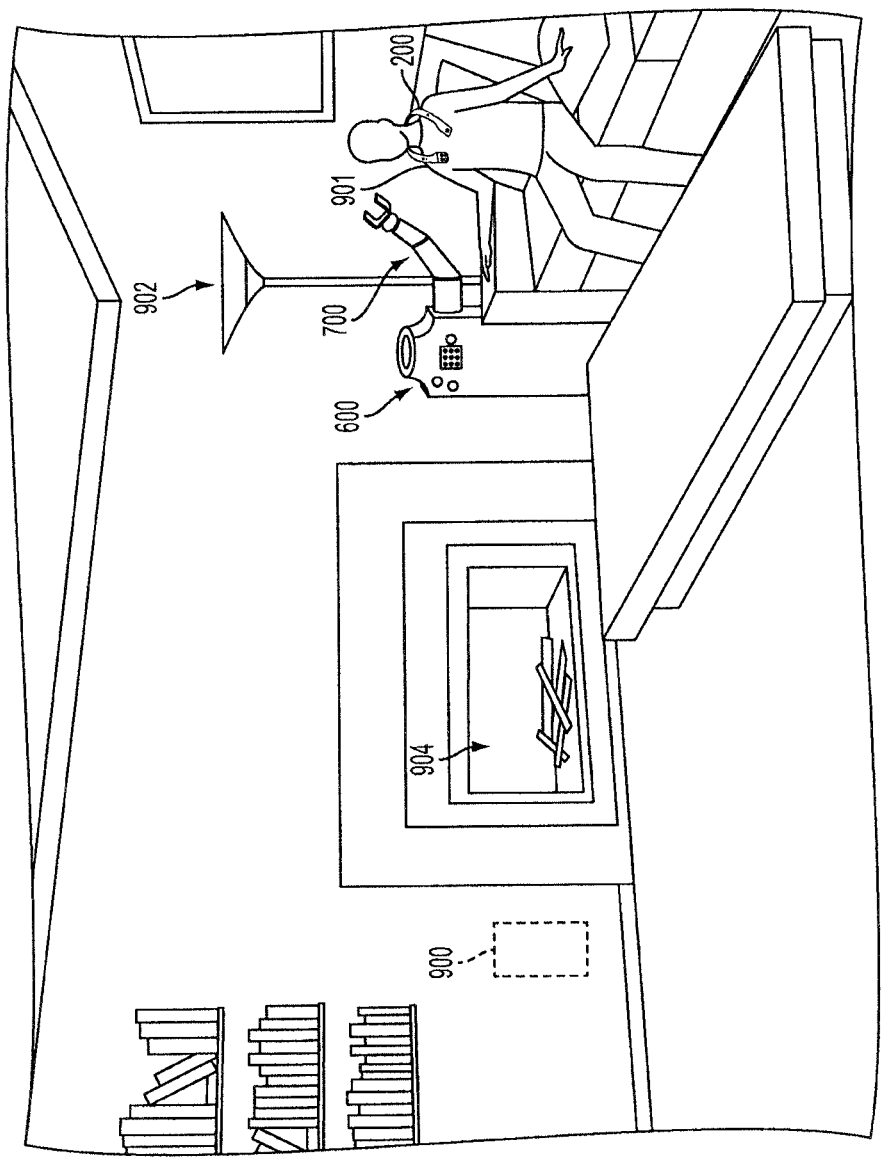
FIG. 9 illustrates an exemplary use of the mobile robot base of FIG. 6, the robot arm of FIG. 7 and the smart necklace of FIG. 2 according to an embodiment of the present invention.

With reference now to FIG. 9, a user 901 of the smart necklace 200 may have a mobile robot base 600 with an arm 700 at his home. At times, the user 901 may desire the mobile robot base 600 to perform particular functions. The mobile robot base 600 may or may not include sufficient processing to perform these desired functions independent of the smart necklace 200.

When the user 901 desires to place the smart necklace 200 on the mobile robot base 600, the user 901 may so indicate by speaking an instruction, selecting a switch or the like. In response, the smart necklace 200 may receive the instruction and transmit a request for the mobile robot base 600 move to the location of the user 901 so that the user 901 may place the smart necklace 200 on the mobile robot base 600. In other embodiments, the instruction may be received by the mobile robot base 600. The mobile robot base 600 may navigate to the location of the smart necklace 200 via data detected by the camera 672, by the sensor 676, by following a beacon transmitted by the smart necklace 200 or the like. In some embodiments, the user 901 may hold the smart necklace 200 out and the end effector 708 of the arm 700 may reach for and grasp the smart necklace 200 and place it in the correct position on the mobile robot base 200.

The user's home may include a wireless charging unit 900 capable of transmitting a wireless power signal. The mobile robot base 600 may be capable of determining a status of its battery 691 and relocating itself near the wireless charging unit 900 in response to determining that the battery 691 is low in charge.

Figure 10:
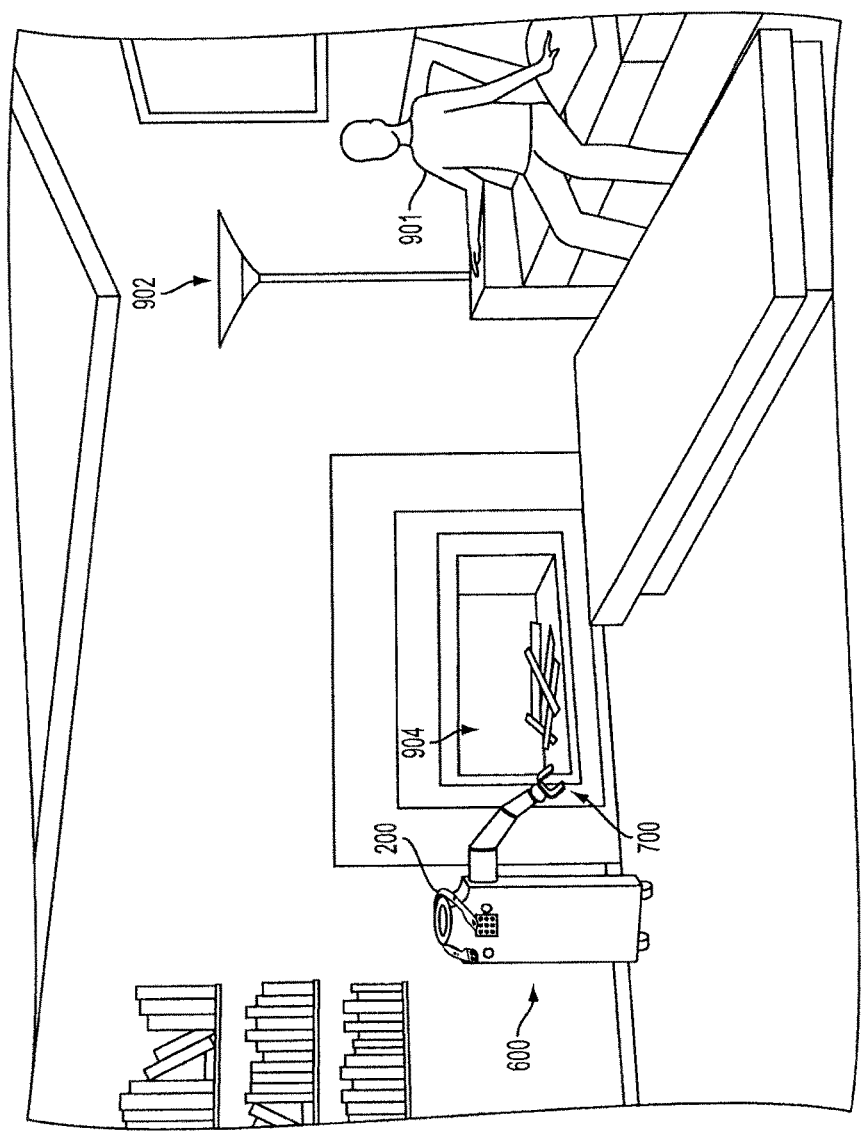
FIG. 10 illustrates a continuation of the exemplary use of the mobile robot base of FIG. 6, the robot arm of FIG. 7 and the smart necklace of FIG. 2 according to an embodiment of the present invention.

With reference now to FIG. 10, the smart necklace 200 is now positioned on the mobile robot base 600 and the mobile robot base 600 is positioned near the wireless charging unit 900 in order to receive the wireless power signal. The user's home includes a lamp 902, a table 906 and a fireplace 904. Because the user 901 may be blind or have other disabilities, the user 901 may not be able to determine if the lamp 902 is on or if a fire is burning in the fireplace 904. The processor 211 and/or the processor 661 may be configured to determine safety actions in response to an undesired circumstance. For example, if one or both of the processors determines that the user 901 has not been in the room for a predetermined amount of time, the mobile robot base 600 and/or the smart necklace 200 may have a goal of putting out the fire and a goal of turning off the lamp 902.

Figure 11:
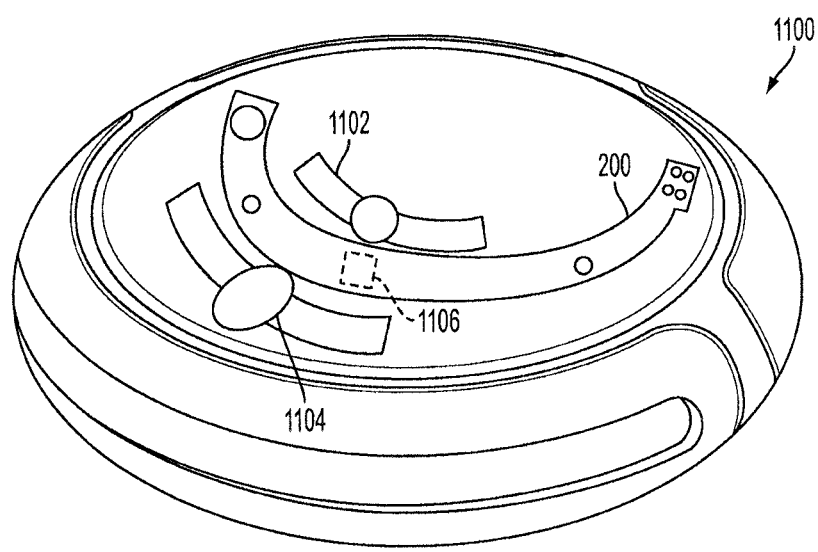
FIG. 11 illustrates a vacuuming robot coupled to the smart necklace of FIG. 2 according to an embodiment of the present invention.

FIG. 11 illustrates another embodiment of a robot 1100 capable of operating in tandem with the smart necklace 200. The robot 1100 may include a first physical connector 1102 and a second physical connector 1104 capable of attaching the smart necklace 200 to the robot 1100. The robot 1100 may also include an electrical connector capable of allowing signals to propagate between the robot 1100 and the smart necklace 200. The robot 1100 may be capable of vacuuming a floor. A processor of the robot 1100 or the processor 211 of the smart necklace 200 may be capable of determining goals such as when to vacuum and a navigation path for the robot 1100 based on data detected by the sensors of the smart necklace 200 and/or sensors of the robot 1100.

In some embodiments, the robot 1100 may include a feature 1106 that causes the smart necklace 200 to be at a greater angle to a top surface of the robot 1100. This allows the sensors of the smart necklace 200 to better detect and/or recognize objects in front, to the sides and/or behind the robot 1100.

Figure 12:
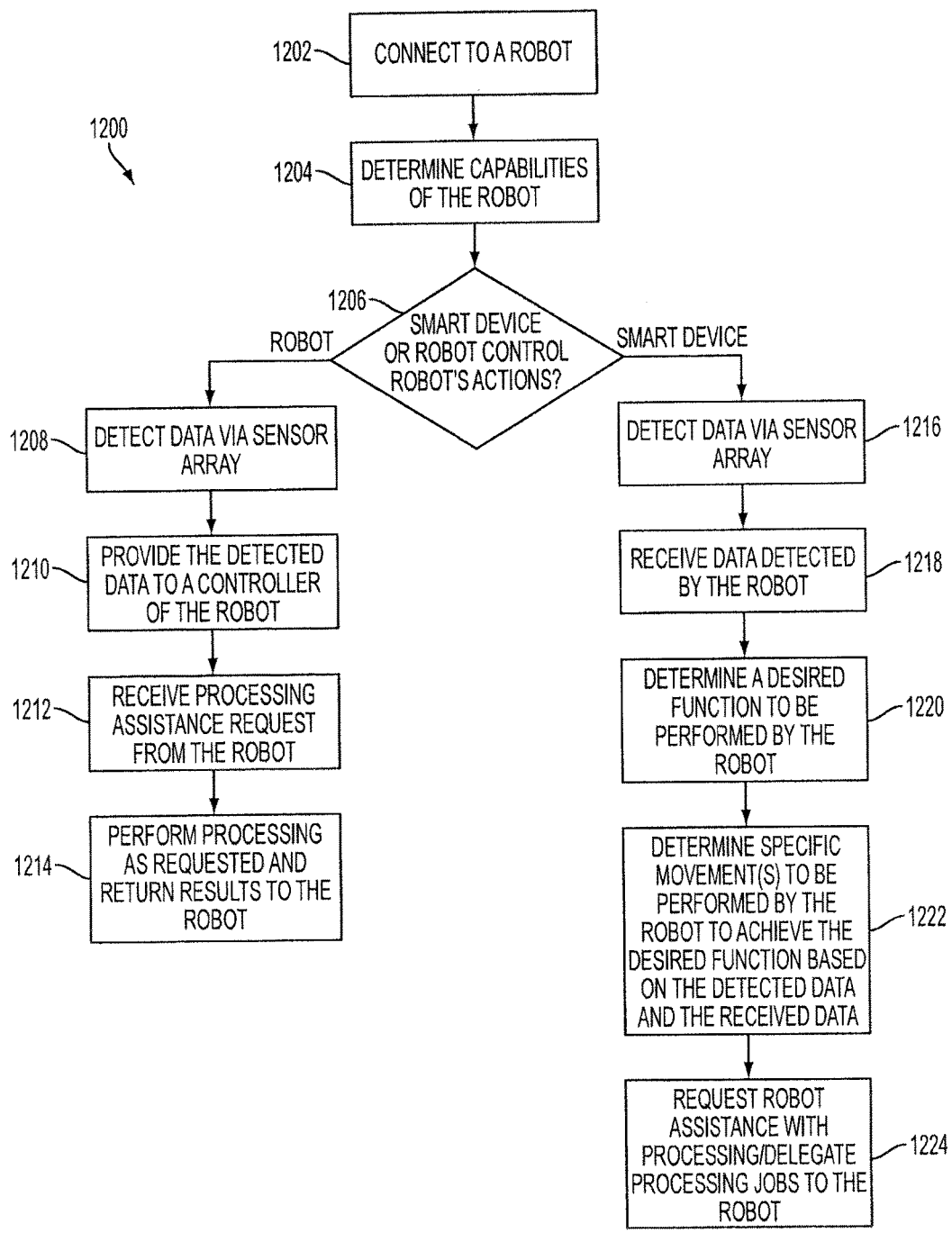
FIG. 12 illustrates a method to be performed by a processor of a wearable mobile device such as the wearable smart device of FIG. 1A according to an embodiment of the present invention.

With reference now to FIG. 12, a method 1200 may be performed by a processor of a wearable smart device such as the wearable smart device 100, the smart necklace 200 or the smart eyeglasses 300. The method 1200 begins in block 1202 where the wearable smart device is physically and/or logically coupled to a robot. In some embodiments, the robot may transmit a signal to the wearable smart device or the wearable smart device may transmit a signal to the robot indicating that the connection is established, after which the method 1200 may proceed.

In block 1204, the processor may determine capabilities of the robot such as types of movement that can be performed by the robot, how much force can be applied using each movement, the processing capabilities of the robot, the sensing capabilities of the robot or the like. This may be determined based on a signal generated from the robot, a response to a query by the wearable smart device or the like.

In block 1206, the processor determines whether the smart device, the robot or a combination of both will be used to control the actions of the robot. If the robot is in control, the method 1200 proceeds to block 1208 and if the wearable smart device is in control, the method proceeds to block 1216. If both the robot and the wearable smart device are in control, then the method 1200 may proceed to both blocks 1208 and 1216 such that a combination of all blocks may be used.

In block 1208, the wearable smart device may detect data via a sensor array. The detected data may include image data, audio data, location data, acceleration data or any other detectable type of data. In block 1210, the detected data may be transmitted to a controller of the robot. In some embodiments, the wearable smart device may instead perform some processing, such as image detection and recognition, prior to sending data to the robot.

In some embodiments, the robot may request that the wearable smart device perform additional processing. In these embodiments, the processor of the wearable smart device may receive the processing assistance request from the robot in block 1212 and perform the requested processing as requested in block 1214.

In block 1216, data may again be detected via the sensor array of the wearable smart device. In some embodiments, the robot may also include sensors capable of detecting data such that it detects and transmits the data to the wearable smart device. In some embodiments, the robot may process at least some of the data prior to transmitting it to the wearable smart device.

In block 1220, the wearable smart device and/or the robot may determine a goal to be achieved by the robot based on an instruction received at the wearable smart device or at the robot, based on an algorithm and/or based on data stored in a memory of either device.

In some embodiments, the wearable smart device may determine how to control the movements of the robot in order to achieve the specific goal. For example, the movement may be a specific movement of an arm, an end effector, providing power to a vacuum or the like. The specific movement to be performed by the robot may be based on detected data. For example, if the robot is to stir a pot, the sensors of the robot or wearable smart device must first detect the location of the pot and then instruct the arm and/or end effector to position the spoon in the pot based on the detected location of the pot.

In some embodiments, the robot may be capable of performing certain processing functions. In block 1224, the processor of the wearable smart device may delegate this processing. For example, the processor of the wearable smart device may request that a main processor of the robot perform additional processing. Additionally, the robot may include lower level controllers capable of causing specific movements or other actions of the robot such as the processor 710 of the arm 700. In these embodiments, the processor of either the wearable smart device or the robot may delegate instructions to these processors.

Figure 13:
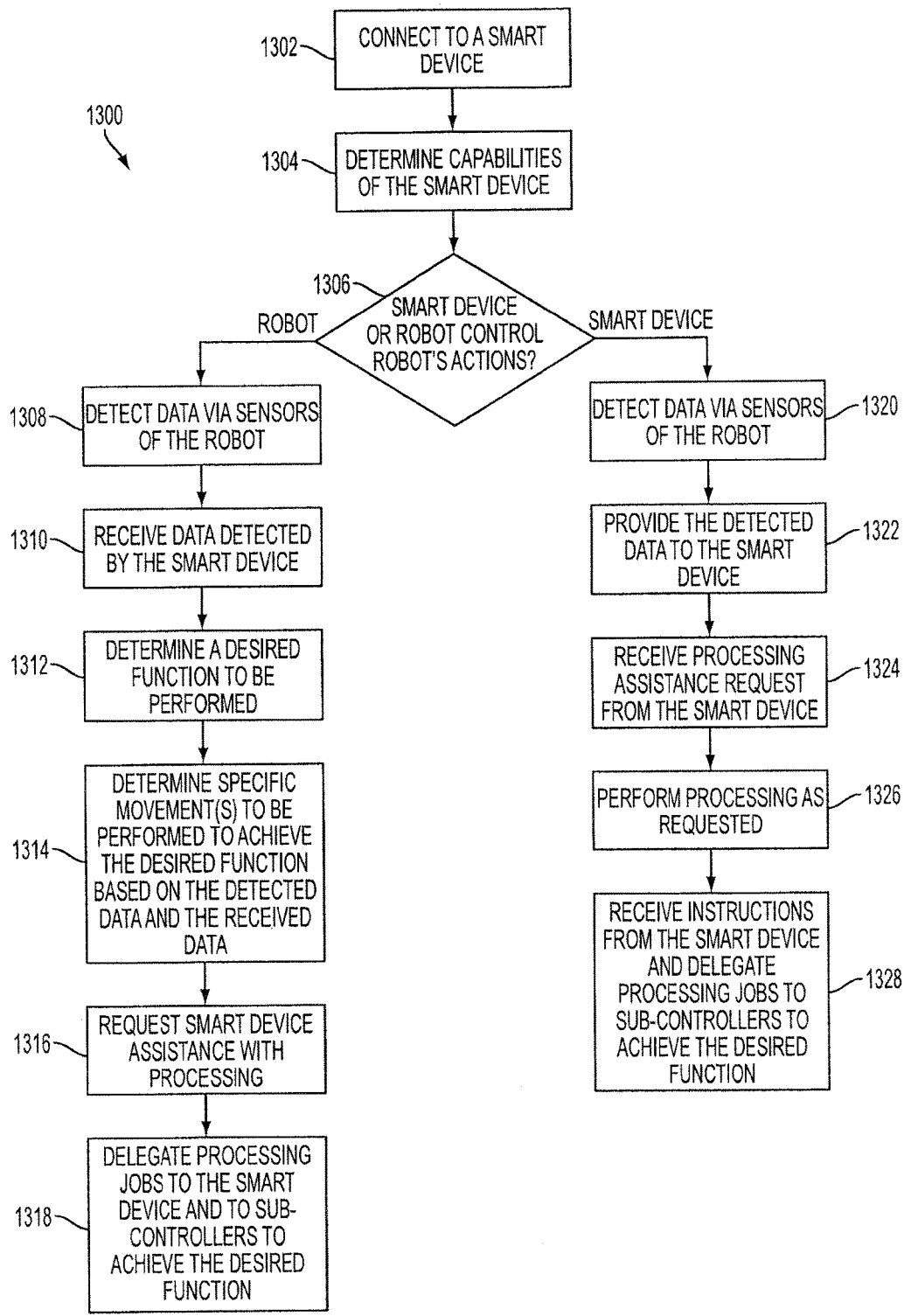
FIG. 13 illustrates a method to be performed by a processor of a robot such as the robot of FIG. 1B according to an embodiment of the present invention.

With reference now to FIG. 13, a robot may be configured to perform a method 1300 when connected to a wearable smart device. In block 1302, the robot is logically and/or physically connected to a wearable smart device. This may be determined in a similar manner as described above with reference to FIG. 12. In block 1304, the processor of the robot may determine the capabilities of the wearable smart device including whether the wearable smart device is configured to control the operation of the robot, to perform data detection, processing capabilities, sensing capabilities or the like.

In block 1306, the processor of the robot determines whether the smart device or the robot is to control the actions and movements of the robot. If the robot is in control of the actions then the method 1300 proceeds block 1308, if the wearable smart device is to control the actions of the robot then the method 1300 proceeds to block 1320 and if both are to control the actions of the robot then the method 1300 may proceed to both block 1308 and block 1320.

In block 1308, sensors of the robot may detect data. In block 1310, the processor of the robot may receive data detected by sensors of the wearable smart device. In some embodiments, the wearable smart device may process at least a portion of the data before transmitting it to the robot so that the robot may receive processed data instead of simply detected data.

In block 1312, the processor of the robot determines a goal to be achieved. This may be determined based on an instruction received at the wearable smart device, an instruction received at the robot, an algorithm or the like.

In block 1314, the processor of the robot may determine specific movements to be performed in order to achieve the desired function. Each distinct movement or combination of movements may be determined by the processor of the robot based on data detected from the sensors of the robot and data received from the wearable smart device.

In some embodiments, a processor of the wearable smart device may be configured to contribute processing power to the robot. In these embodiments, the processor of the robot may request specific processing by the wearable smart device in block 1316 or the processor of the wearable mobile device may contribute without request.

In block 1318, the processor of the robot may delegate the processing jobs to the wearable smart device and may receive feedback from the processor of the wearable smart device based on the processing request. The processor of the robot may also delegate processing jobs to lower-level controllers of the robot, such as an arm controller, in order to achieve the desired function.

Returning to block 1320, data may be detected by sensors of the robot. In block 1322, the detected data may be transmitted to the wearable smart device. In some embodiments, the robot may perform processing of the data before transmitting it to the wearable smart device such that the robot transmits processed data instead of or in addition to detected data.

In some embodiments, the robot may assist the wearable smart device with processing requests. In these embodiments, the robot may receive the processing assistance request from the wearable smart device in block 1324. In block 1326, the processor of the robot may perform the requested processing.

In block 1328, the processor of the robot may receive instructions from the wearable smart device on what actions should be performed in order to achieve the desired function. In some embodiments, the processor of the robot may control the actions directly, in some embodiments, the processor of the robot may delegate the action control to sub-controllers and in some embodiments, the processor of the robot may directly control some actions and delegate some action control to sub-controllers.

The wearable smart device may then transmit control instructions to the robot. The processor of the robot may apply the control instructions in order to cause the robot to perform specific movements towards achievement of the desired function. In some embodiments, this includes delegating processing jobs to lower-level controllers.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A robot that processes instructions independently and in conjunction with a wearable smart device, the robot comprising:
   a sensor device configured to detect environmental data of an environment of the robot;
   an input/output port for sending and receiving data to and from the wearable smart device including a presence or a lack of presence of a user within a home; and
   a processor coupled to the input/output port and the sensor device, the processor being configured to:

obtain, from the sensor device, the environmental data of the environment of the robot, obtain, from the wearable smart device and by a sensor of the wearable smart device, the data including the presence or the lack of presence of the user within the home, determine a powered state of a remotely controllable smart device within the home of the user, determine that the lack of presence of the user within the home has occurred over a predetermined amount of time based on the data and the environmental data, determine a first action that includes changing the powered state of the remotely controllable smart device based on the lack of presence of the user within the home over the predetermined amount of time, change the powered state of the remotely controllable smart device within the home of the user, determine that the wearable smart device is to control a second action of the robot, receive, from the wearable smart device, a request for processing assistance, perform the request for processing assistance, receive, from the wearable smart device, an instruction to perform the second action, and perform a processing job to achieve the second action, or delegate the processing job to achieve the second action.

2. The robot of claim 1, further comprising:
determine capabilities of the wearable smart device;
request processing power from the wearable smart device; and
delegate a processing job to the wearable device to change the powered state of the remotely controllable smart device.

3. The robot of claim 1, wherein the sensor device includes at least one of a camera, an inertial measurement unit (IMU) or a global position system (GPS).

4. A robot that processes instructions independently and in conjunction with a wearable smart device, the robot comprising:
a sensor device configured to detect environmental data of an environment of the robot;
an input/output port for sending and receiving data to and from the wearable smart device including a presence or a lack of presence of a user within a home; and
a processor coupled to the input/output port and the sensor device, the processor being configured to:
obtain, from the sensor device, the environmental data of the environment of the robot,
obtain, from the wearable smart device, the data including the presence or the lack of presence of the user within the home,
determine that the lack of presence of the user within the home has occurred over a predetermined amount of time based on the data and the environmental data,
determine a first action that includes changing a powered state of a remotely controllable smart device based on the lack of presence of the user within the home over the predetermined amount of time,
change the powered state of the remotely controllable smart device within the home of the user,
determine that the wearable smart device is to control a second action of the robot,
receive, from the wearable smart device, a request for processing assistance, perform the request for processing assistance,
receive, from the wearable smart device, an instruction to perform the second action, and
perform a processing job to achieve the second action, or delegate the processing job to achieve the second action.

5. The robot of claim 4, wherein the processor is further configured to:
establish a connection with the wearable smart device; and
determine capabilities of the wearable smart device.

6. The robot of claim 4, wherein the processor is configured to delegate the processing job to the wearable smart device to achieve the second action.

7. The robot of claim 4, wherein the processor is configured to:
perform the processing job to achieve a part of the second action; and
delegate a second processing job to achieve another part of the second action.

8. A robot that processes instructions independently and in conjunction with a wearable smart device, the robot comprising:
a sensor device configured to detect environmental data of an environment of the robot;
an input/output port for sending and receiving data to and from the wearable smart device including a presence or a lack of presence of a user within a home; and
a processor coupled to the input/output port and the sensor device, the processor having at least two auxiliary processors and being configured to:
obtain, from the sensor device, the environmental data of the environment of the robot,
obtain, from the wearable smart device and by a sensor of the wearable smart device, the data including the presence or the lack of presence of the user within the home,
determine that the lack of presence of the user within the home has occurred over a predetermined amount of time based on the data and the environmental data,
determine a first action to be performed by the robot, the first action including changing a powered state of a remotely controllable smart device within the home of the user based on the lack of presence of the user over the predetermined amount of time,
perform, using the at least two auxiliary processors, a first processing job to achieve the first action, or delegate using the at least two auxiliary processors, the first processing job to achieve the first action,
determine that the wearable smart device is to control a second action of the robot,
receive, from the wearable smart device, a request for processing assistance,
perform the request for processing assistance,
receive, from the wearable smart device, an instruction to perform the second action, and
perform a second processing job to achieve the second action, or delegate the second processing job to achieve the second action.

9. The robot of claim 8, wherein the processor is configured to determine a plurality of capabilities of the robot including at least one of a plurality of processing capabilities of the robot or a plurality of sensing capabilities of the robot.

10. The robot of claim 8, wherein the processor is configured to:
perform the first processing job to achieve the first action; and delegate the second processing job to achieve the second action.

11. The robot of claim 8, further comprising:
a physical connector that is configured to attach the wearable smart device to the robot; and
an electrical connector that is configured to propagate a signal between the wearable smart device and the robot.

12. The robot of claim 8, wherein the processor is configured to determine that a combination of both the wearable smart device and the robot controls the robot.

* * * * *